(12) United States Patent
Fallahi

(10) Patent No.: US 8,044,629 B2
(45) Date of Patent: Oct. 25, 2011

(54) SELF-TUNING VIBRATION ABSORBER

(75) Inventor: Behrooz Fallahi, Naperville, IL (US)

(73) Assignee: Northern Illinois University, DeKalb, IL (US)

( * ) Notice: Subject to any disclaimer, the term of this patent is extended or adjusted under 35 U.S.C. 154(b) by 533 days.

(21) Appl. No.: 12/201,584

(22) Filed: Aug. 29, 2008

(65) Prior Publication Data
US 2010/0057260 A1    Mar. 4, 2010

(51) Int. Cl.
*G05B 5/01* (2006.01)
(52) U.S. Cl. ........ 318/611; 318/116; 318/371; 318/375; 267/195
(58) Field of Classification Search ........... 318/139, 318/254, 371–374, 611–612, 623, 609, 610, 318/116, 153, 375, 685; 73/147, 774; 267/195
See application file for complete search history.

(56) References Cited

U.S. PATENT DOCUMENTS

| | | | |
|---|---|---|---|
| 989,958 A | 4/1911 | Frahm | |
| 5,091,679 A * | 2/1992 | Murty et al. | 318/153 |
| 5,296,785 A * | 3/1994 | Miller | 318/254.1 |
| 5,441,298 A * | 8/1995 | Miller et al. | 280/5.501 |
| 5,627,443 A * | 5/1997 | Kimura et al. | 318/696 |
| 5,814,964 A * | 9/1998 | Kimura | 318/685 |
| 5,818,193 A * | 10/1998 | Sasaki | 318/685 |
| 6,285,972 B1 * | 9/2001 | Barber | 703/8 |
| 6,646,410 B2 * | 11/2003 | Rich et al. | 318/799 |
| 6,920,951 B2 * | 7/2005 | Song et al. | 180/165 |
| 7,005,816 B2 * | 2/2006 | Hio et al. | 318/375 |
| 7,423,393 B2 * | 9/2008 | Wakao et al. | 318/371 |
| 7,443,121 B2 * | 10/2008 | Nagai et al. | 318/434 |
| 7,679,306 B2 * | 3/2010 | Jones | 318/611 |
| 2004/0150361 A1 * | 8/2004 | Hio et al. | 318/375 |
| 2005/0212189 A1 * | 9/2005 | Kondo et al. | 267/195 |
| 2006/0095180 A1 * | 5/2006 | Ummethala et al. | 701/37 |

OTHER PUBLICATIONS

Vasudeva, R. P., et al; "Vibration absorber under earth quake type base excitation", Journal of the Institution of Engineers (India) Civil Engineering Division, 50(9 pt. CI 5): 271-4 (1970).

Akesson, B.A.; "Dynamic damping of wind-induced stochastic vibrations", ASME (Paper), n 75-DET-10, 11p (1975).

Jagadish, K.S., et al; The inelastic vibration absorber subjected to earthquake ground motions; Earthquake Engineering an Structural Dynamics, 7: 317-326 (1979).

Amyot, J.R., et al; "Simulation studies of a vibration damper for wind-induced motion of a tall building", Computers in Engineering, Proceedings of the International Computers in Engineering Conference and Exhibit, pp. 673-681 (1984).

(Continued)

*Primary Examiner* — Paul Ip
(74) *Attorney, Agent, or Firm* — Kohn & Associates, PLLC

(57) ABSTRACT

A self-tuning vibration absorber including a carrier rod assembly having operatively connected thereto a mounting mechanism for mounting the carrier rod assembly to a primary system and a hollow shafted motorized tuning mechanism for tuning a phase difference between vibration of the primary system and vibration of the carrier rod assembly to 90 degrees, the carrier rod assembly further including a detecting mechanism for detecting the vibration of the primary system and the vibration of the carrier rod assembly, and a controller in electrical connection with the detecting mechanism and the tuning means for controlling the tuning mechanism based on the vibration of the primary system and the vibration of the carrier rod assembly detected. A method of vibration dampening, a method of controlling a self-tuning vibration absorber, and a method of reducing hunting motion in railcars.

19 Claims, 23 Drawing Sheets

OTHER PUBLICATIONS

Kirk, R.G., et al; "Effect of support flexibility and damping on the synchronous response of a single-mass flexibility rotor", ASME Pap 71-Vibr-72, 12p, Sept 8-10, 1971.

Kulkarni, S, et al; "Laboratory model of dynamic vibration absorber", Journal of the Institution of Engineers (India), Part MC: Mechanical Engineering Division, 54(Part ME 5): 182-190 (1974).

Mizuno, et al; "Balancing machine using dynamic vibration absorber (measurement with an undamped dynamic vibration absorber)", Nippon Kikai Gakkai Ronbunshu, C Hen/JSME Transactions, Part C, 61(582): 519-524 (1995).

Groh, A.R.; "Dynamic vibration absorber principle applied to a high-quality phonograph pickup", Journal of the Audio Engineering Society, 25(6):385-390 (1977).

Kawakami, T.; "Nkk automatic ship vibration control system (navics)", Nippon Kokan Technical Report Overseas, 52: 69-70, (1988).

Fischer, O.; "Some experience with the use of vibration absorbers of aerial masts", Acta Technica CSAV (Ceskoslovensk Akademie Ved), 19(2): 234-247 (1974).

Jacquot, R.G.; Optimal dynamic vibration absorbers for general beam systems. Journal of Sound and Vibration, 60 (4): 535-542 ((1978).

Thompson, A.G.; Optimum tuning and damping of a dynamic vibration absorber applied to a force excited and damped primary system. Journal of Sound and Vibration 77(3): 403-415 (1981).

Hunt, J.B., et al; The broadband dynamic vibration absorber. Journal of Sound and Vibration 83(4): 573-578 (1982).

Kojima, H.; Forced vibrations of a beam with a non-linear dynamic vibration absorber. Journal of Sound and Vibration 88(4): 559-568 (1983).

Yamaguchi, H.; "On optimum design of a composite beam dynamic vibration absorber", Nippon Kikai Gakkai Ronbunshu, C Hen/JSME Transactions, Part C, 56(524): 915-920 (1990).

Asami, T., et al; "Optimum design of dynamic absorbers for a system subjected to random excitation", JSME International Journal, Series 3: Vibration, Control Engineering, Engineering for Industry, 34(2): 218-226 (1991).

Bonsel, J.H., et al; "Application of a dynamic vibration absorber to a piecewise linear beam system", Nonlinear Dynamics, 37(3): 227-243 (2004).

Wang, Y., et al; "Optimum design of DVA in the multidegrees-of-freedom system", Zhendong yu Chongji/Journal of Vibration and Shock, 23(4): 67-69 (2004).

Chang, J. C.H., et al; "Structural control using active tuned mass dampers", Journal of the Engineering Mechanics, pp. 1091-1098 (1980).

Sommerfeldt, S. D., et al; "Adaptive control of a two-stage vibration mount", Proceedings of the 27th Conference on Decision and Control, pp. 2039-2044 (1988).

Olgac, N., et al; "Vibration absorbers utilizing only position measurements for time varying excitation frequencies", ASME, Dynamic Systems and Control Division (Publication) DSC, Symposium on Mechatronics, 50: 223-229 (1993).

Olgac, N., et al; "Single mass dual frequency fixed delayed resonator (DFFDR)", Proceedings of the American Control Conference, 3,: 2049-2053 (1995).

24. Lee-Glauser, G.J., et al; "Integrated passive/active vibration absorber for multi-story buildings", Journal of Engineering and Applied Science, 3: 1714-1723 (1995).

Slavicek, J., et al; "Design and application of a self-optimizing damper for increasing machine tool performance," Advances in Machine Tool Design and Research: Proceedings of the 10th International Machine Tool Design and Research Conference. pp. 71-81 (1969).

Wang, K.W. et al; "Control of an adaptable dynamic absorber for transient vibration suppression," Proceedings of the 2nd Conference on Recent Advances in Active Control of Sound and Vibration, pp. 506-515 (1993).

Ryan, M.W.; "Control of an adaptive passive vibration absorber", ASME (Paper), 93-WA/NCA-4, pp. 1-6 (1993).

Ryan, M.W., et al, "Adaptive-passive vibration control of single frequency excitations applied to noise control," Proceedings of Noise Conference, pp. 461-466 (1994).

Buhr, C., "Non-collocated adaptive passive vibration control", Journal of Sound and Vibration, 206(3): 371-398 (1997).

Williams, K., et al; "Adaptive-passive absorbers using shape memory alloys," Journal of Sound and Vibration, 249 (5): 835-848 (2002).

Kamopp, D., et al; "Vibration control using semiactive force generators," Journal of Engineering for Industry, pp. 619-626 (1974).

Hrovat, et al; "Semi-active verses passive or active tuned mass dampers for structural control," Journal of Engineering Mechanics, 109: 691-705 (1983).

Rakheja, S., et al; "Vibration and shock isolation performance of a semi-active on-off damper," Journal of Vibration, Acoustics, Stress and Reliability in Design, 107: 398-403 (1985).

Miller, L.R.; "Tuning passive, semi-active, and fully active suspension systems," Proceedings of the 27th Conference on Decision and Control, IEEE, pp. 2047-2053 (1988).

Walsh, P.L. et al; "Variable stiffness vibration absorber for minimization of transient vibrations", Journal of Sound and Vibration, 158(2):195-211 (1992).

Jalili, N., et al; "A new approach to semi-active vibration suppression using adjustable inertia absorbers," Int. Journal of Modeling and Simulation, 21(2): 148-154 (2001).

Fallahi, B., et al; "Tonal tuning of a variable inertia vibration absorber: a feasibility study," Proceedings of DETC'03, 4th Symposium on Multibody Dynamics and Vibration of the 19th Biennial Conference on Mechanical Vibration and Noise, DETC2003/VIB-48336, Chicago, Illinois USA (2003).

Megahed, S.M., et al; "Modeling and simulation of a variable inertia vibration absorber," proceeding of the 8th Cairo University International Conference (MDP-8), Cairo, Egypt, pp. 277-288 (2004).

Megahed, et al; "Dynamic modeling of variable inertia vibration absorber using non-dimensional analysis" Proceeding of the 8th International Conference on Production Engineering Design and Control (PEDAC'2004), Alexandria, Egypt (2004).

El-Kabbany, A.; "Variable Inertia Vibration Absorbers: Vibration Control and Parametric Study", M.Sc. Thesis, Faculty of Engineering, Cairo University, Egypt (2006).

Den Hartog, J. P.; "Mechanical Vibrations", McGraw Hill Company, Fourth Edition, pp. 93-104 (1956).

Dimarogonas, A. D.. et al; "Vibrations for engineers,"Prentice-Hall International Editions (1992).

35. Tanaka, N., et al; "Impact vibration control using a semi-active damper," Journal of Sound and Vibration, 158(2): 277-292 (1992).

Haiyan, H.; "Semi-Active Vibration Control Based on a Vibration Absorber with Adjustable Clearance", Transactions of Nanjing University of Aeronautics & Astronautics, 13(2) (1996).

Koo, J., et al; "In Search of Suitable Control Methods for Semi-Active Tuned Vibration Absorbers", Journal of Vibration and Control, http://jvc.sagepub.com/cgi/content/abstract/10/2/163 (2004).

Shen, Y., et al; "Semi-Avtive Vibration Contol Schemes for Suspension Systems Using Magnetorheological Dampers", Journal of Vibration and Control, http://jvc.sagepub.com/cgi/content/abstract/12/1/3 (2006).

* cited by examiner

SELF-TUNING VIBRATION ABSORBER

STATEMENT REGARDING FEDERALLY SPONSORED RESEARCH OR DEVELOPMENT

Research in this application was supported in part by a grant from the National Science Foundation (NSF Grant No. OISE-0108951). The Government has certain rights in the invention.

BACKGROUND OF THE INVENTION

1. Field of the Invention

Generally, the present invention relates to a self-tuning vibration absorber. More specifically, the present invention relates to a self-tuning vibration absorber for the vibration suppression of mechanical systems.

2. Description of the Related Art

Vibration suppression of mechanical systems has many applications in various mechanical structures such as, but not limited to, machines, tall buildings, bridges, offshore platforms, pipelines, and aircraft cabins. A dynamic vibration absorber (DVA), otherwise known as a tuned mass damper, is a device that is placed within mechanical structures in order to prevent damage or structural failure due to vibrations within the mechanical structures. In general, a small DVA can offset the vibration of a large mechanical structure by moving in opposition to the natural resonance frequency of the mechanical structure.

DVAs can be classified into three main types: passive, active, and semi-active. A passive vibration absorber, shown generally in FIG. 1, is a single degree of freedom system, which consists of a mass, a spring and a damper and was first patented by Frahm. Passive DVAs are relatively simple devices and very cost effective. They have a wide range of applications, among them are structures and buildings, rotating machinery, mechanical devices, ships, and antennas.

Optimal tuning of absorber parameters has been the subject of intense research. For a passive absorber to be effective, its natural frequency should be tuned to the excitation frequency. The performance of a passive DVA deteriorates significantly if the excitation frequency deviates from the absorber tuned frequency. Adding damping to the absorber will enlarge its bandwidth at the expense of its effectiveness. This is the primary motive for developing active and semi-active DVAs. In an active DVA, shown generally in FIG. 2, a force-generating device is added to a passive DVA. Then, the active component is controlled to achieve a higher level of vibration suppression and bandwidth. In semi-active DVAs, one of the absorber parameters (effective inertia, damping, or stiffness) is tuned online for a more effective vibration suppression. A semi-active system only requires signal processing and a low level of power signals as opposed to full power electronics in an active system.

A variable stiffness vibration absorber was developed by Slavicek and Bollinger (1969) using nonlinear stiffness characteristics of plastic elements. Wang and Lai (1993) developed a control theory during rotational system startup using variable stiffness. Ryan (1993, 1994) presented a preliminary study of an adaptive-passive approach to reduce vibration using a variable stiffness DVA by changing the spring length. Buhr and Franchek (1997) developed a control law for tuning a variable stiffness vibration absorber to attenuate a single frequency excitation in a non-collocated case. Williamas, et al. (2002) used shape memory alloy to construct and test a variable stiffness DVA. FIGS. 3A and 3B show two methods that can be employed to change the stiffness of the absorber.

Changing the damping of the absorber is another alternative for vibration suppression that can be achieved in two ways—(1) by varying the size of an orifice or (2) by changing the viscosity of magneto- or electro-rheological fluids. The third alternative is to change the effective inertia of the absorber. Jalili, et al. (2001) proposed the concept of a variable inertia vibration absorber (VIVA), as shown in FIG. 4. The change in absorber effective inertia is achieved by moving a sliding mass on a hinged rod. Fallahi, et al. (2003) examined the dynamics of this new class of semi active vibration absorber and its tonal tuning, shown in FIG. 5. Fallahi, et al. disclosed a linearized model that is derived and used for tonal tuning. A comparison of tuned and de-tuned responses is also reported.

Megahed, et al. (2004) proposed a different configuration for VIVA, shown in FIG. 6. In this configuration, the end of the spring is pivoted to a sliding block on the absorber arm. This keeps the spring and damper parallel to excitation force and hence increases the effectiveness of the DVA. Megahed, et al. developed the non-dimensional models of the three different designs of VIVA.

El-Kabbany (2006) disclosed a different configuration of this type of vibration absorber using a torsion spring and a torsion damper instead of linear springs and dampers, see FIG. 7. El-Kabbany does not disclose the physical construction of the device or the improvements of the present invention.

Semi-active vibration suppression is an important class of vibration control techniques whereby a physical parameter of the vibration absorber is changed to achieve the desired performance.

Koo, et al. (2004) reported a control method for tuned semi-active vibration absorbers. Koo, et al. considered four control policies and reported that on-off groundhook control performs the best. Hu Haiyan (1996) presented a study on a semi-active control strategy based on an adjustable clearance in an elastic component. The control law is derived by using harmonic balancing. The results of simulations are reported that confirms the efficacy of the implemented method. Shen, et al. (2006) studied three semi active control methods for use in a suspension system using magnetorheological fluids. The performance of these methods is investigated experimentally under sinusoidal and random excitation. It is shown that Rakheja-Sankar control and modified skyhook control methods outperform limited relative displacement controller.

Despite the large amount of work currently being performed, there is still a need for a system of vibration dampening that is both effective and can be easily adjusted.

BRIEF SUMMARY OF THE INVENTION

The present invention provides a self-tuning vibration absorber including a carrier rod assembly having operatively connected thereto a mounting mechanism for mounting the carrier rod assembly to a primary system and a hollow shafted motorized tuning mechanism for tuning a phase difference between vibration of the primary system and vibration of the carrier rod assembly to 90 degrees, the carrier rod assembly further including a detecting mechanism for detecting the vibration of the primary system and the vibration of the carrier rod assembly, and a controller in electrical connection with the detecting mechanism and the hollow shafted motorized tuning mechanism for controlling the hollow shafted motorized tuning mechanism based on the vibration of the primary system and the vibration of the carrier rod assembly detected.

The present invention also provides for a method of vibration dampening, including the steps of detecting a vibration of a primary system and detecting a vibration of a carrier rod assembly, analyzing the vibrations to determine a phase difference between the vibration of the primary system and the vibration of the carrier rod assembly, adjusting a hollow shafted motorized tuning mechanism in the carrier rod assembly to tune the phase difference between the vibration of the primary system and the vibration of the carrier rod assembly to 90 degrees, and dampening the vibration of the primary system and the carrier rod assembly.

The present invention further provides for a method of controlling a self-tuning vibration absorber, including the step of adjusting a hollow shafted motorized tuning mechanism to tune a phase difference between vibration of a primary system and vibration of a carrier rod assembly to 90 degrees.

The present invention also provides for a method of reducing hunting motion in railcars, including the steps of detecting a vibration of a railcar and detecting a vibration of a carrier rod assembly, analyzing the vibrations, adjusting a hollow shafted motorized tuning mechanism in the self-tuning vibration absorber to tune a phase difference between the vibration of the railcar and the vibration of the carrier rod assembly to 90 degrees; and dampening the vibration of the railcar and the carrier rod assembly to reduce hunting motion.

BRIEF DESCRIPTION OF THE SEVERAL VIEWS OF THE DRAWINGS

Other advantages of the present invention will be readily appreciated as the same becomes better understood by reference to the following detailed description when considered in connection with the accompanying drawings wherein.

DETAILED DESCRIPTION OF THE INVENTION

The present invention generally provides for semi-active vibration suppression of unwanted vibration in mechanical systems by using a self-tuning vibration absorber, shown generally at 10 in the figures and, more specifically, a carrier rod assembly, shown at 12 in the figures. Semi-active vibration suppression is an important class of vibration control techniques whereby a physical parameter of the vibration absorber is changed to achieve the desired performance.

An "absorber" as used herein means a device for absorbing vibration of a mechanical system. Absorber is also used herein as a shortened form of the self-tuning vibration absorber 10. The self-tuning vibration absorber 10 is also used to refer to the system as a whole, including controls, whereas "absorber" and "absorber rod" is used to refer to the carrier rod assembly 12 that is physically performing the action of absorbing or dampening vibrations, such as in the examples and equations below.

A "primary system" as used herein means a mechanical system or structure that is in need of vibration dampening, such as, but not limited to, a building, a train, a bridge.

A "controller" as used herein means a device that is capable of sending, receiving, processing, and analyzing signals, such as, but not limited to, a computer.

Figure 8:
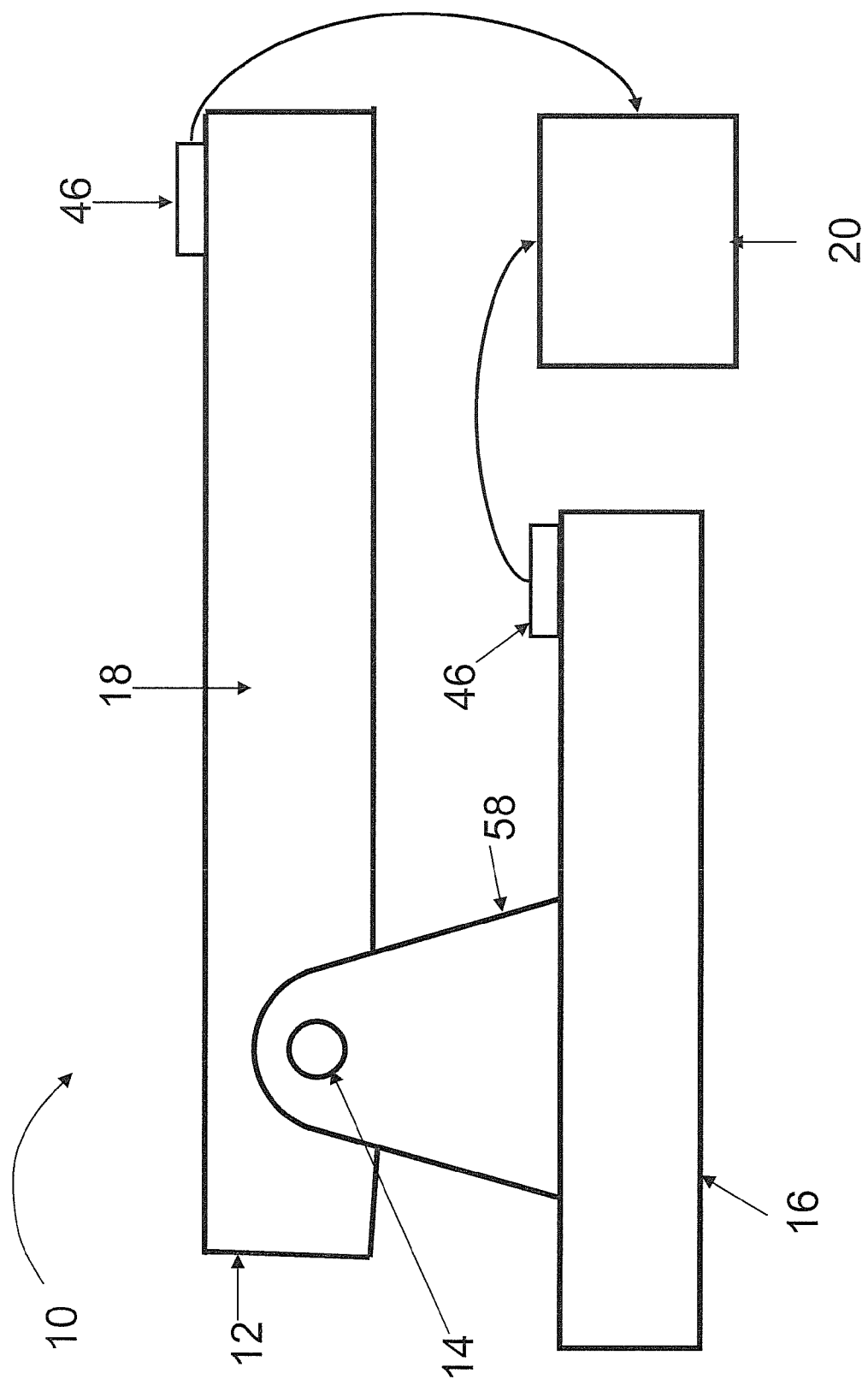
FIG. 8 is a schematic diagram of the self-tuning vibration absorber and carrier rod assembly of the present invention.

As shown in FIG. 8, the self-tuning vibration absorber 10 includes the carrier rod assembly 12. Operatively connected to the carrier rod assembly 12 is a mounting mechanism 14 for mounting the carrier rod assembly 12 to a primary system 16. Also operatively attached to the carrier rod assembly 12 is a hollow shafted motorized tuning mechanism 18 (referred to hereinafter as "tuning mechanism 18") for tuning a phase difference between vibration of the primary system 16 and vibration of the carrier rod assembly 12 to 90 degrees. The carrier rod assembly 12 also includes a detecting mechanism 46 for detecting the vibration of the primary system and the vibration of the carrier rod assembly. The self-tuning vibration absorber 10 further includes a controller 20 in electrical connection with the tuning mechanism 18 that is used for controlling the tuning mechanism 18 based on the vibration of the primary system and the vibration of the carrier rod assembly detected.

Figure 9:
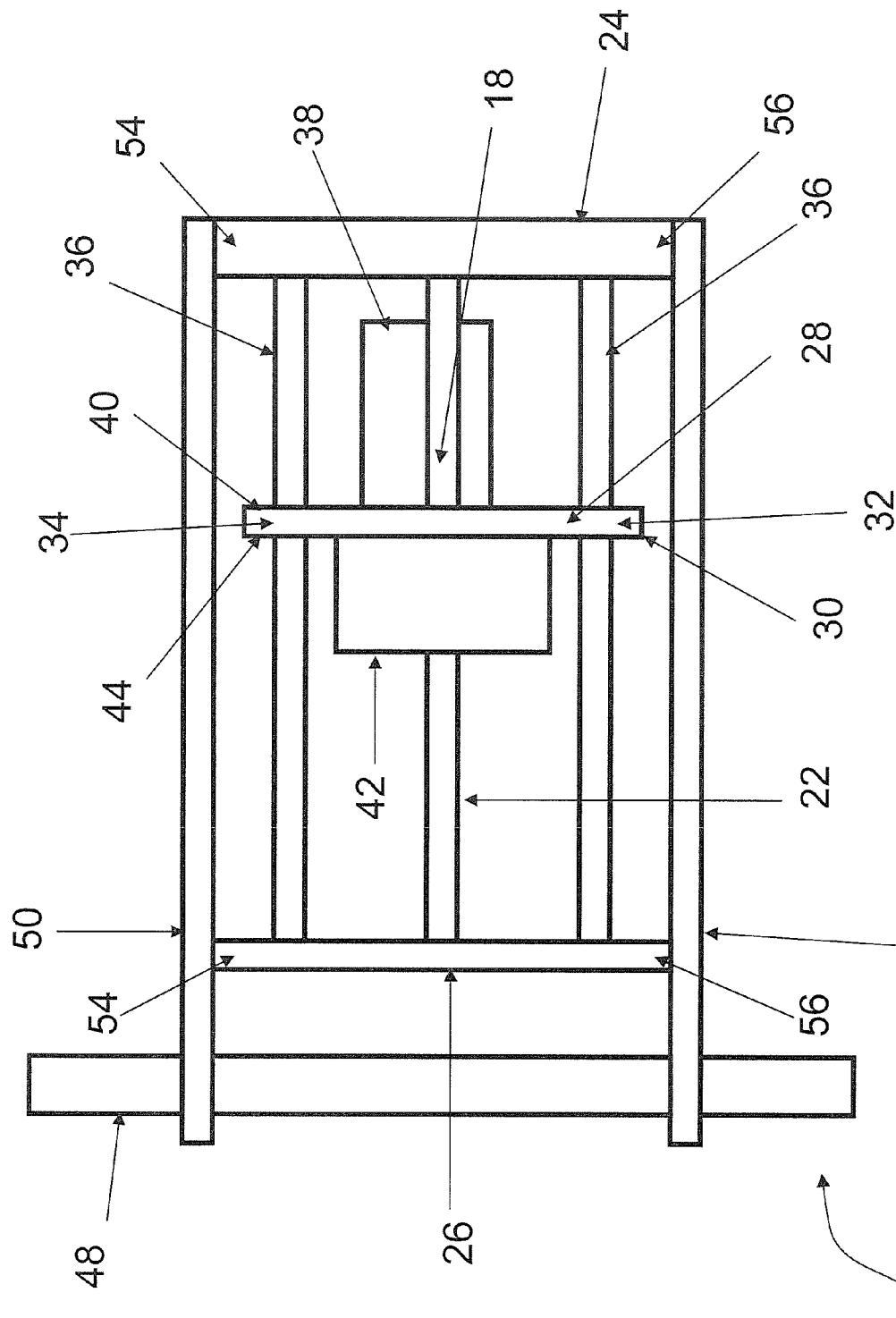
FIG. 9 is a schematic diagram of the carrier rod assembly.

The carrier rod assembly 12 is shown in further detail in FIG. 9. Essentially, the carrier rod assembly 12 houses the tuning mechanism 18. Preferably, the carrier rod assembly 12 includes a screw rod 22 operatively attached to a first end plate 24 and a second end plate 26. The screw rod 22 is preferably operatively attached in the center of the first end plate 24 and second end plate 26. The tuning mechanism 18 is adjustably movable along the screw rod 22 in order to dampen vibrations and is further described below.

The carrier rod assembly 12 can further include a guide mechanism 28 for guiding the tuning mechanism 18 along the screw rod 22. The guide mechanism 28 provides further stability to the tuning mechanism 18 as it moves along the screw rod 22. Preferably, the guide mechanism 28 is a guide plate 30. The guide plate 30 is slidably connected on a right side 32 and on a left side 34, i.e. on opposite sides, to guide bars 36, which are operatively attached to the first endplate 24 and second endplate 26 in parallel with the screw rod 22.

The hollow shafted motorized tuning mechanism 18 includes a tuning mass 38 operatively attached to a top side 40 of the guide plate 30 and a motor 42 operatively attached to a bottom side 44 of the guide plate 30. Essentially, the tuning mechanism 18 is a motorized tuning mass 38. The motor 42 moves the tuning mass 38 up and down the screw rod 22 according to signals received from the controller 20. The motor 42 can include a stopping mechanism such as a nut to hold the tuning mass 38 in place along the screw rod 22. The motor 42 has a hollow shaft which allows it to be used as part of the tuning mass 38, making the tuning mechanism 18 more effective than previous tuning mechanisms. This feature has the effect of achieving more bandwidth for the carrier rod assembly 12. The ratio of the tuning mass 38 to the absorber 10 mass plays a critical role to the bandwidth of the absorber 10 (the frequency range at which the absorber has the ability of suppressing the vibration). The effect is that higher bandwidth can be achieved for a higher ratio of the tuning mass to absorber mass. The motor 42 with hollow shaft makes it possible to use the motor 42 as part of the tuning mass 38 and hence increases the ratio of the mass of the tuning mass 38 to the absorber 10 mass. This increase is considerable as motors are generally heavy. The tuning mass 38 is further referred to as a moving block, tuning block, and slidable block in the equations and examples below.

The carrier rod assembly 12 preferably includes a detecting mechanism 46, i.e. accelerometers 46, for detecting vibration of the primary system 16 and vibration of the self-tuning vibration absorber 10. The accelerometers 46 are in electrical connection with the controller 20. This connection can be wireless or wired. The accelerometers 46 are operatively and removably attached to both the primary system 16 and the carrier rod assembly 12. Preferably, one accelerometer 46 is placed in operable connection with the carrier rod assembly 12 and one accelerometer 46 is placed in operable connection with the primary system 16; however, multiple accelerometers 46 can be used to obtain an average vibration.

The controller 20 can be any suitable computer processing unit including any necessary software for operation. The controller 20 receives signals from all of the accelerometers 46, processes these signals, and sends signals to the tuning mechanism 18 in order to adjust the position of the tuning mechanism 18 along the screw rod 22. The controller 20 is in electrical connection and communication with both the accelerometers 46 and the tuning mechanism 18, and preferably, this connection is wireless. The controller 20 also includes an algorithm for computing XOR phase measurement and determine the phase difference between the vibration of the primary system 16 and the vibration of the carrier rod assembly 12. Critically, this algorithm is responsible for adjusting the tuning mechanism 18 to the correct place along the screw rod 22 based on readings from the accelerometers 46 in order to achieve a tuned position. The tuned position is defined as the position at which the undamped natural frequency of the carrier rod assembly 12 is the same as the excitation frequency of the primary system. This phase difference occurs at 90 degrees. The algorithm for detecting phase difference is discussed in much more detail below and in the examples. The critical equations of the algorithm include Equations 28 and 29 discussed below.

The mounting mechanism 14 can be any suitable mechanism to mount the carrier rod assembly 12 to the primary system 16. For example, the mounting mechanism 14 can be a rod 48 rotatably attached to a first side plate 50 but fixed to a second side plate 52. The first side plate 50 is operatively attached to a left end 54 of the first end plate 24 and a left end 54 of the second end plate 26. The second side plate 52 is operatively attached to a right end 56 of the first end plate 24 and a right end 56 of the second end plate 26. In other words, the first side plate 50 is attached to one end of the first end plate 24 and second end plate 26, and the second side plate 52 is attached to an opposite end of the first end plate 24 and second end plate 26. One end of rod 48 is rotatably attached to the support 58 while the other end is fixed to the support 58. This allows the rod 48 to have longer effective length without compromising its transverse load-bearing capacity. The support 58 can be fastened with any suitable type of fasteners, such as, but not limited to, screws, nails, or bolts. Essentially, the rod 48 acts as a torsion spring and also a transverse load bearing element. This reduces the dead mass of the absorber 10 (structural mass) and hence increases the ratio of the tuning mass 38 to the structural absorber mass 10.

Each of the parts of the self-tuning vibration absorber 10 can be made with materials known in the art. Also, the self-tuning vibration absorber 10 can be made in different sizes depending on the primary system 16 that requires vibration dampening.

The self-tuning vibration absorber 10 operates as in the following methods. The present invention includes a method of vibration dampening, by detecting a vibration of a primary system and a vibration of a carrier rod assembly, analyzing the vibrations to determine a phase difference between the vibration of the primary system and the vibration of the carrier rod assembly, moving a hollow shafted motorized tuning mass to tune the phase difference between the vibration of the primary system and the vibration of the carrier rod assembly to 90 degrees, and dampening the vibration of the primary system and the carrier rod assembly.

Essentially, vibration of the primary system 16 is detected with the accelerometer 46 operatively attached to the primary system 16 and vibration of the carrier rod assembly 12 is detected with the accelerometer 46 operatively attached to the carrier rod assembly 12. The accelerometers 46 send signals to the controller 20. The controller 20 then analyzes the signals from the accelerometers 46 with the XOR phase measurement algorithm mechanism. This algorithm mechanism determines the phase difference between the vibration of the primary system 16 and the vibration of the carrier rod assembly 12. The controller 20 then sends signals to the hollow shafted motorized tuning mechanism 18 in order to move the tuning mechanism 18 along the screw rod 22 with the motor 42. The end result is that the tuning mechanism 18 is moved so that the phase difference between the primary system and the vibration of the carrier rod assembly 12 to 90 degrees, thus allowing for vibration dampening of the entire system.

The present invention also provides for a method of controlling the self-tuning vibration absorber 10 by moving the hollow shafted motorized tuning mechanism 18 to tune the phase difference between vibration of the primary system 16 and vibration of the carrier rod assembly 12 to 90 degrees. This control is provided by the equations disclosed herein for the XOR phase measurement algorithm mechanism.

The present invention further provides for a method of reducing hunting motion in railcars, by detecting a vibration of a railcar and detecting a vibration of a carrier rod assembly, analyzing the vibrations, adjusting a hollow shafted motorized tuning mass in the carrier rod assembly to tune a phase difference between the vibration of the railcar and the vibration of the carrier rod assembly to 90 degrees, and dampening the vibration of the railcar and the carrier rod assembly to reduce hunting motion. Each of these steps are performed essentially as described above. The carrier rod assembly 12 can be placed about a wheelset of the railcar to reduce hunting motion or it can be placed in any other suitable site on the railcar. A reduction in hunting motion enables the train to move at higher speeds and reduces potential damage to the wheels, the railcar, and any items being transported, and increases comfort inside the railcar.

Also, the self-tuning vibration absorber 10 can be used in any other system in need of vibration dampening. Such systems include, but are not limited to, buildings, bridges, and manufacturing equipment.

Below, equations are developed to model the system. The primary system 16 is modeled as a mass-spring-damper. The equations of motion of the whole system are derived using Lagrange approach. This set of equations is simplified and then a set of non-dimensional equations is derived. These non-dimensional equations are used to obtain a tuning law that uses the phase difference between the carrier rod assembly 12 and the primary system 16 acceleration signals. This phase difference is found to be 90 degrees at tuned state and it is used to construct a design procedure whereby the stiffness of the carrier rod assembly 12 and tuning mass 38 are determined for a given excitation frequency band.

Figure 1:
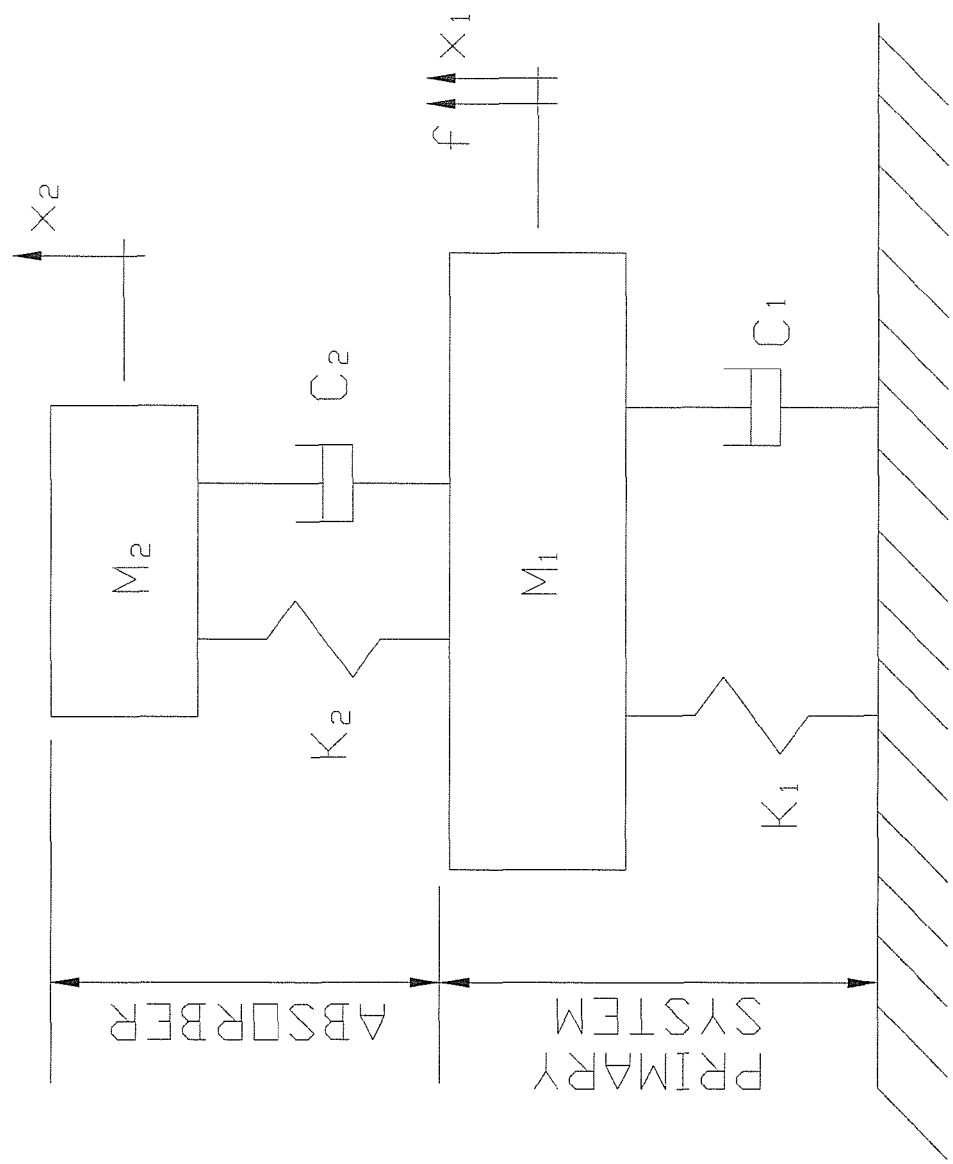
FIG. 1 is a schematic diagram of a passive DVA.
Figure 2:
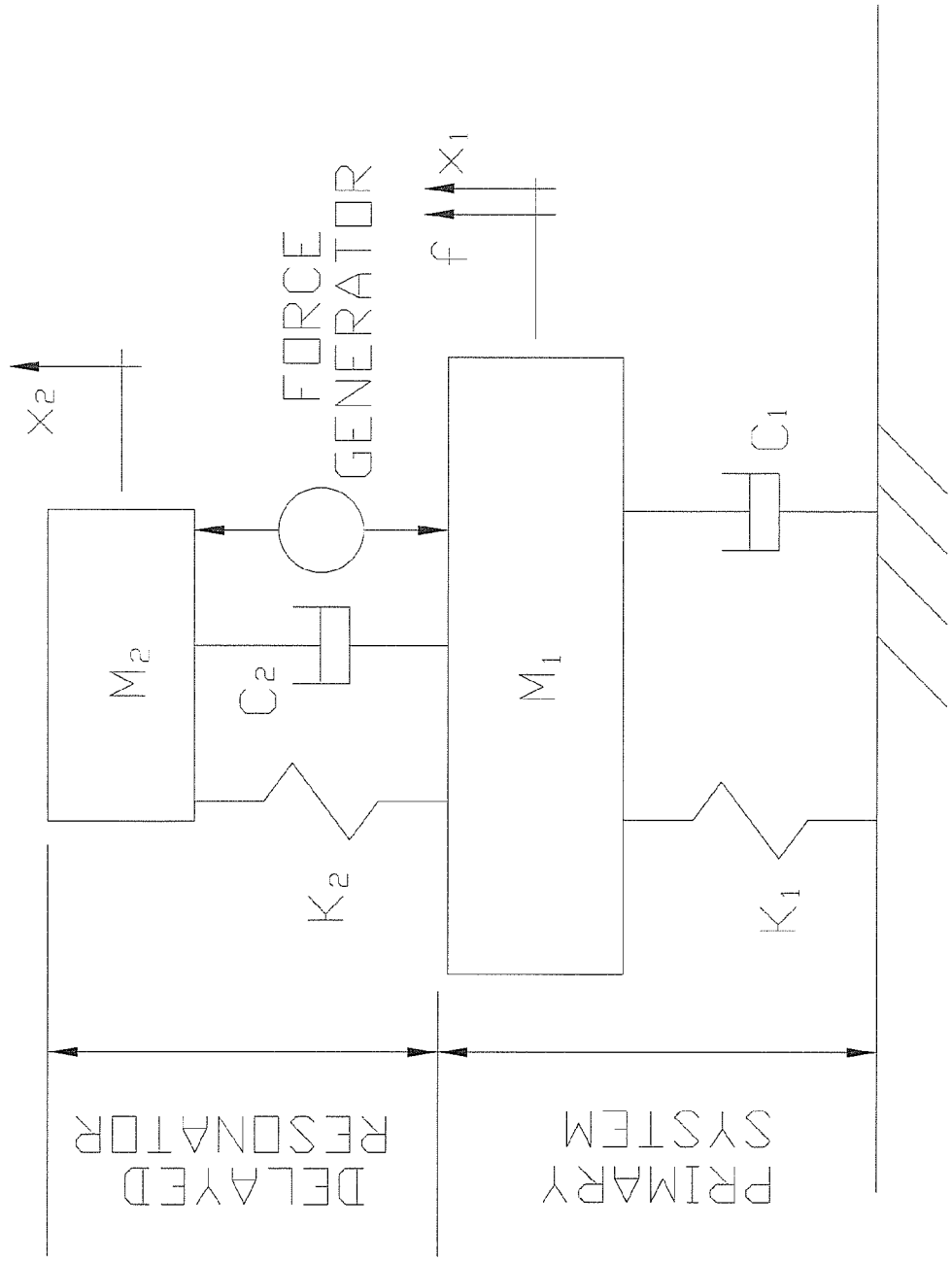
FIG. 2 is a schematic diagram of a delayed resonator.
Figure 3A:
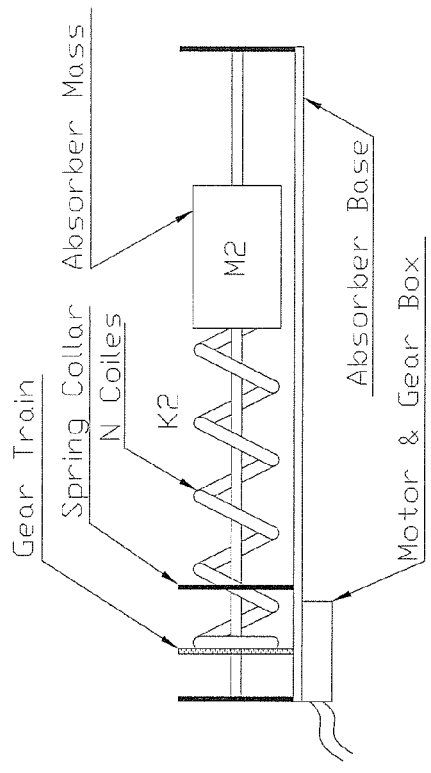
FIGS. 3A and 3B are schematic diagrams of two types of variable stiffness vibration absorbers.
Figure 3B:
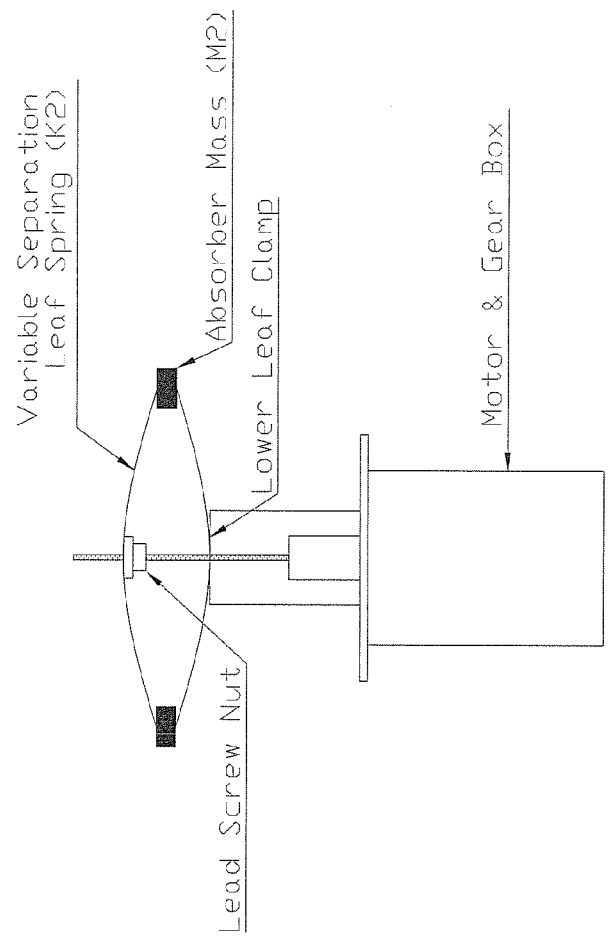
Figure 4:
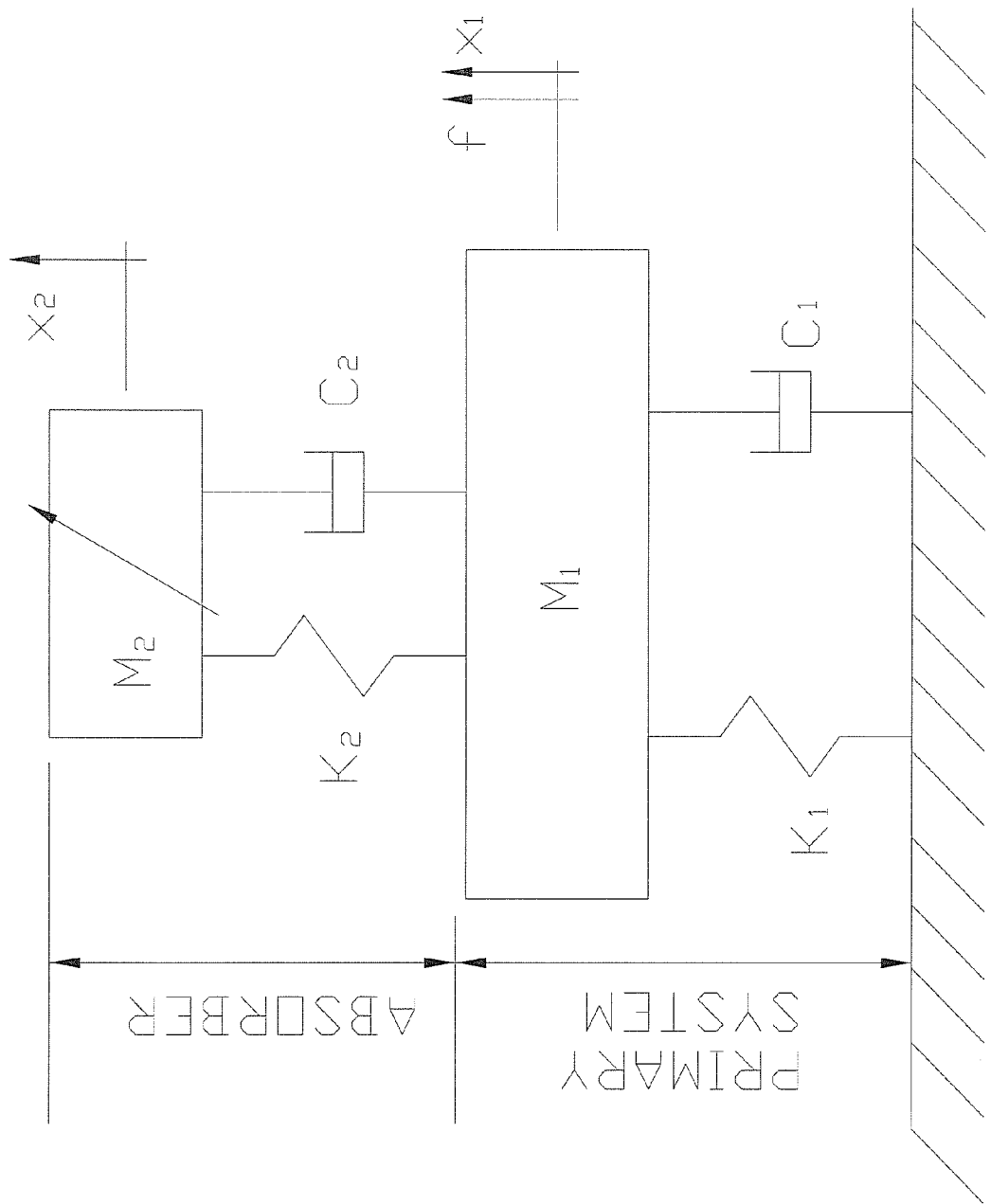
FIG. 4 is schematic diagram of a VIVA.
Figure 5:
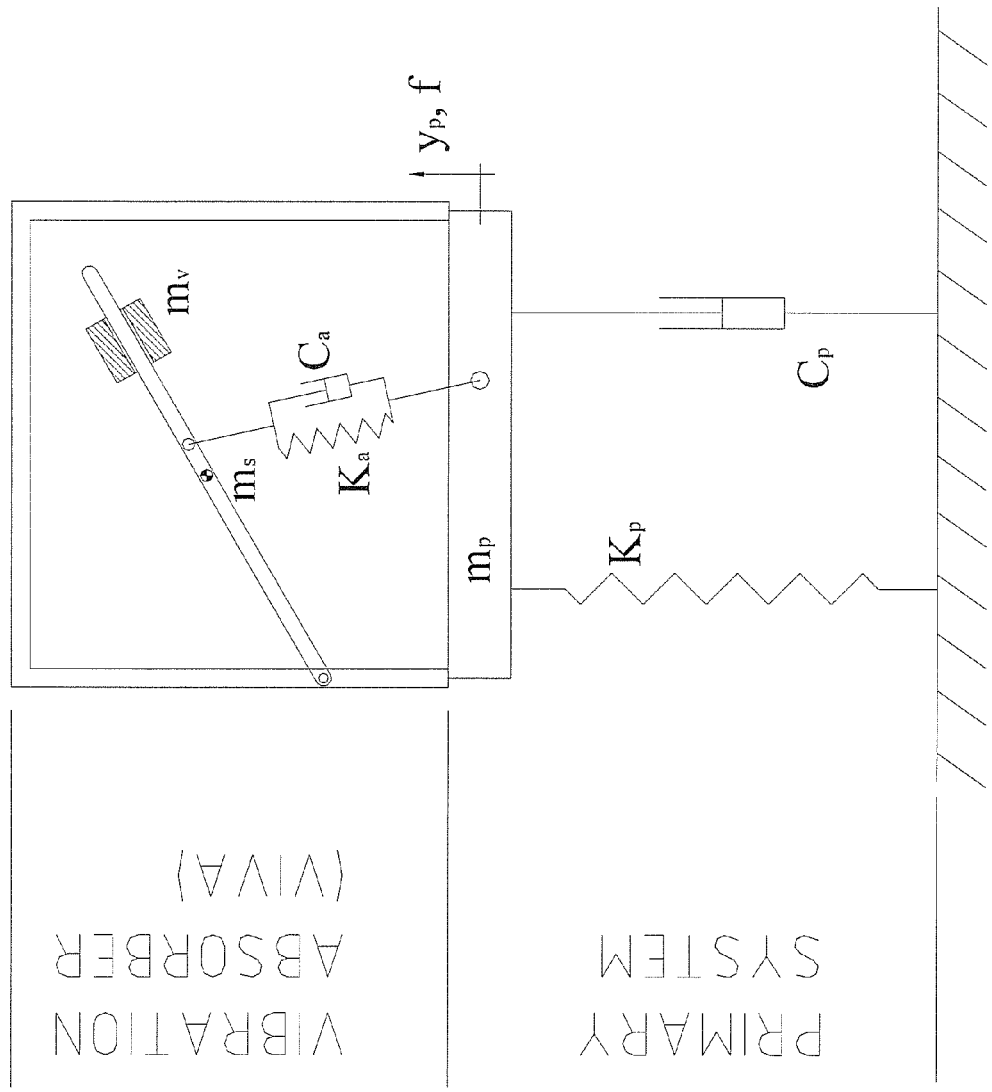
FIG. 5 is a schematic diagram of a Jalili-Fallahi VIVA.
Figure 6:
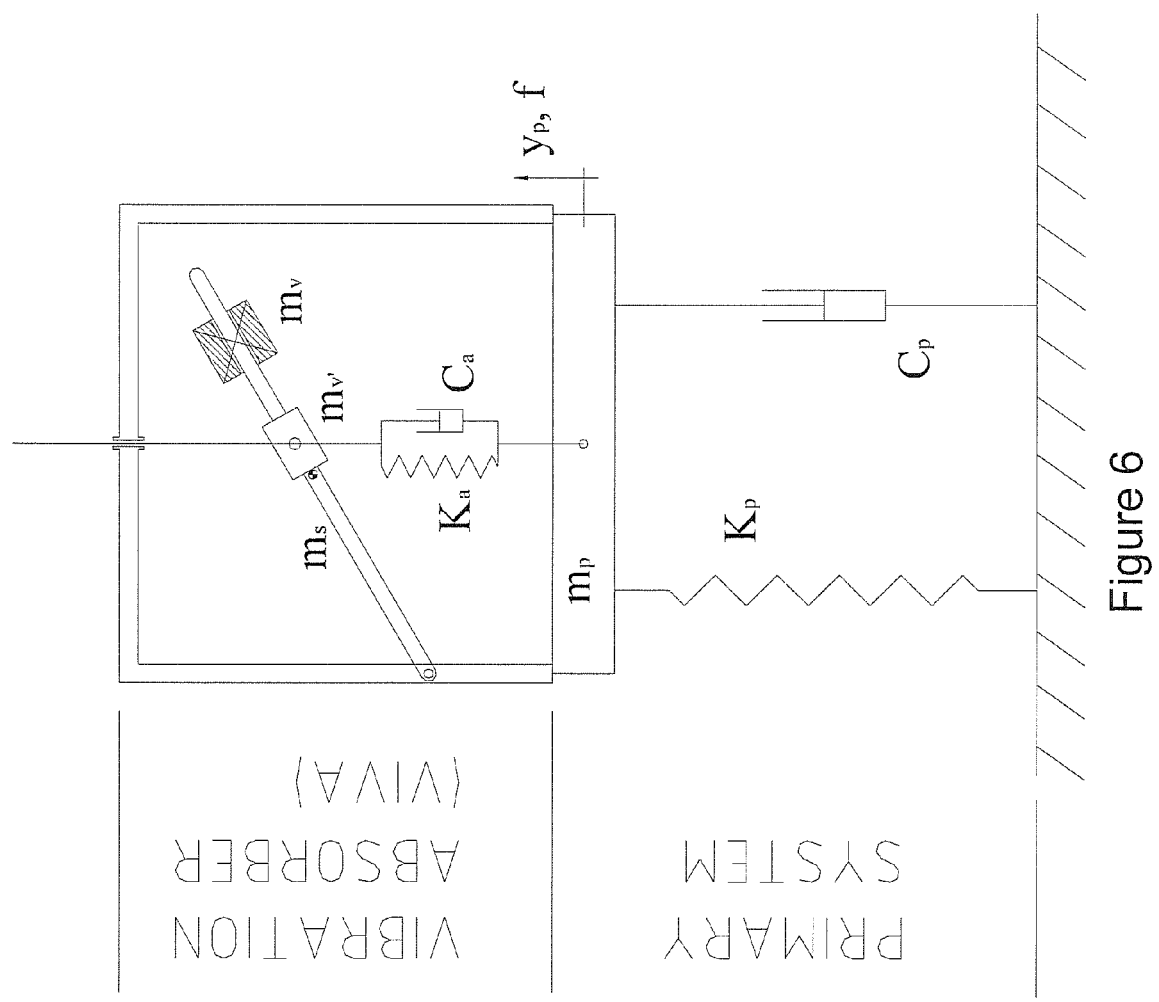
FIG. 6 is a schematic diagram of a Megahed-El-Kabbany VIVA.
Figure 7:
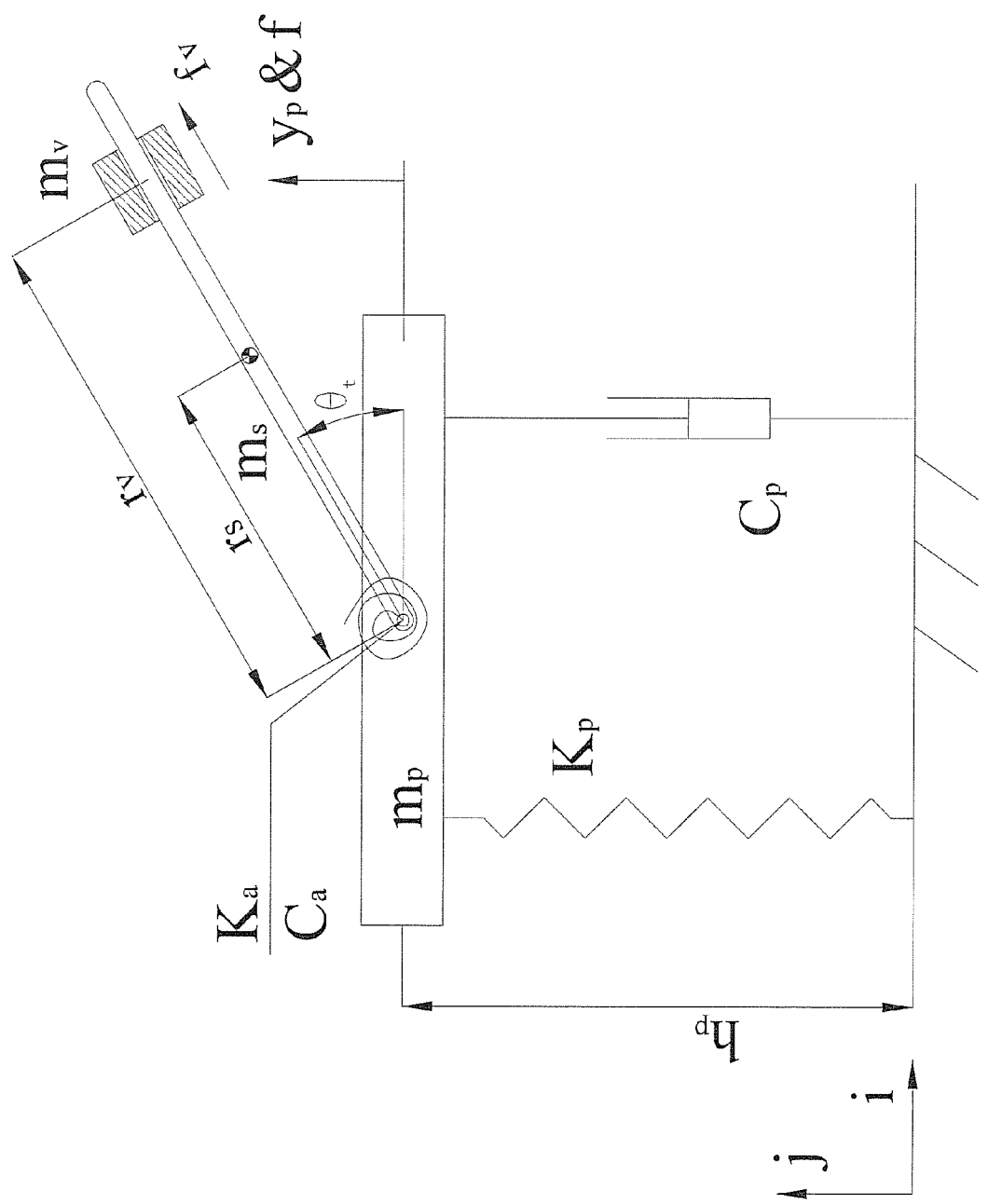
FIG. 7 is a schematic diagram of an El-Kabbany VIVA.

As discussed above, El-Kabbany developed a semi-active vibration absorber incorporating torsional spring and damper, as in FIG. 7. The present invention provides a novel control strategy based on El-Kabbany design. More specifically, the controller 20 was developed to position the tuning mass 38 and tune the phase difference between the primary system 16 vibration and the carrier rod assembly 12 vibration, to 90 degrees. This was achieved by implementing the XOR phase measurement algorithm mechanism. The XOR method is adapted for faster execution time compared to FFT calculations of the prior art. More specifically, a set of non-dimensional equations governing the dynamics of the carrier rod assembly 12 and the primary system 16 were derived. This set of equations was used to derive a tuning law which, in turn, was used to construct a design procedure for the carrier rod assembly 12 and the self-tuning vibration absorber 10.

Simulations were performed to give insight into the control scheme using the carrier rod assembly 12 mathematical model. A test-rig was constructed using the developed tuning law. The effectiveness of the approach for vibration suppression for a given excitation frequency band was experimentally verified. Also, a parametric study was conducted and the effect of damping on the performance of the carrier rod assembly 12 is herein reported. A comparative study was conducted and the performance of the VIVA was compared to that of an optimal absorber using Den Hartog Method.

Mathematical Modeling of VIVA

VIVA Absorber Parameters:

FIG. 7 shows a schematic of the VIVA under the present study and a primary system. The primary system consists of a mass, $m_p$, supported by a spring $k_p$ and a damper $c_p$. The absorber consists of a uniform rod and a tuning block. The rod is connected to the primary system by a torsional spring $k_a$, and a torsional damper $c_a$ as shown in the FIG. 7. The rod mass is $m_s$ and its length is $2 r_s$ with a tuning block of mass $m_v$ which slides on it. The absorber is tuned by changing the position $r_v$ of the sliding block. The primary mass is subjected to an excitation force f and the sliding block is moved by a force $f_v$. The system has three degrees of freedom: the primary mass displacement $y_p$, the absorber rod rotation $\theta$, and the sliding block displacement $r_v$.

Referring to FIG. 7, the absorber rod angle $\theta_t$ is:

$$\theta_t = \theta_f - \theta_d + \theta \tag{1}$$

where $\theta_t$ is the total absorber rod angle, $\theta_f$ is absorber rod angle at zero spring deflection, $\theta$ is the absorber rod angular deviation from its equilibrium position and $\theta_d$ is the absorber rod angle at its equilibrium position measured from zero deflection position. This angle must satisfy the following equation:

$$k_a \theta_d - (m_s r_s + m_v r_v) g \cos(\theta_f - \theta_d) = 0 \tag{2}$$

where g is the gravitational acceleration.

System Equations of Motion:

The system equations of motion are developed using modified Lagrange formulation. That is:

$$\frac{d}{dT}\left(\frac{\partial T}{\partial \dot{q}}\right) - \frac{\partial T}{\partial q} + \frac{\partial D}{\partial \dot{q}} + \frac{\partial U}{\partial q} = \Gamma \mid \tag{3}$$

where: T is the Kinetic energy, D is the dissipation power, U is the potential energy, q is the generalized coordinate, and $\Gamma$ is the generalized force. The total kinetic energy is:

$$T = T_p + T_s + T_v \tag{4}$$

with $$T_p = \frac{1}{2} m_p \dot{y}_p^2 \tag{5}$$

$$T_s = \frac{1}{2} m_s \left( \dot{y}_p^2 + \frac{4}{3} r_s^2 \dot{\theta}^2 + 2 r_s \dot{y}_p \dot{\theta} \cos(\theta_t) \right) \mid \tag{6}$$

$$T_v = \frac{1}{2} m_v \left( \dot{y}_p^2 + \dot{r}_v^2 + r_v^2 \dot{\theta}^2 + 2 \dot{y}_p \dot{r}_v \sin(\theta_t) + 2 \dot{y}_p r_v \dot{\theta} \cos(\theta_t) \right) \tag{7}$$

The total dissipated power is given by:

$$D = \frac{1}{2} c_p \dot{y}_p^2 + \frac{1}{2} c_a \dot{\theta}^2 \tag{8}$$

The total potential energy is given by:

$$U = \frac{1}{2} k_p (y_p - \delta_p)^2 + \frac{1}{2} k_a (\theta - \theta_d)^2 + m_p g (h_p + y_p) + \\ m_s g (h_p + y_p + r_s \sin(\theta_t)) + m_v g (h_p + y_p + r_v \sin(\theta_t)) \tag{9}$$

where $\delta_p$ and $h_p$ are the static deflection of the primary mass and the height of the primary mass at static equilibrium position, respectively. Substituting Equation (2) and (4) through (9) into Equation (3), the following four equations are obtained:

$$k_p \delta'_p - (m_p + m_s + m_v) g = 0 \tag{10}$$

$$(m_p + m_s + m_v) \ddot{y}_p + (m_s r_s + m_v r_v) \cos(\theta_t) \ddot{\theta} + m_v \ddot{r}_v \sin(\theta_t) - \\ (m_s r_s + m_v r_v) \sin(\theta_t) \dot{\theta}^2 + 2 m_v \dot{r}_v \dot{\theta} \cos(\theta_t) + c_p \dot{y}_p + k_p y_p = f \mid \tag{11}$$

$$(m_s r_s + m_v r_v) \ddot{y}_p \cos(\theta_t) + \\ \left( \frac{4}{3} m_s r_s^2 + m_v r_v^2 \right) \ddot{\theta} + 2 m_v r_v \dot{r}_v \dot{\theta} + c_a \dot{\theta} + k_a \theta = 0 \mid \tag{12}$$

$$m_v \ddot{y}_p \sin(\theta_t) + m_v \ddot{r}_v - m_v r_v \dot{\theta}^2 + m_v g \sin(\theta_t) = f_v \mid \tag{13}$$

If $r_v(t)$, which defines the tuning block position, is assumed to be a known function of time, the force needed to move the tuning block could be obtained from equation (13). In this case, equations (11 and 12) describe the dynamics of the primary system with the absorber.

For small $\theta_t$ and slow motion of the tuning block, $\dot{r}_v \approx 0$, equations (11) and (12) have the form:

$$(m_p + m_s + m_v)\ddot{y}_p + (m_s r_s + m_v r_v)\ddot{\theta} + c_p \dot{y}_p + k_p y_p = f \quad (14)$$

$$(m_s r_s + m_v r_v)\ddot{y}_p + \left(\frac{4}{3}m_s r_s^2 + m_v r_v^2\right)\ddot{\theta} + c_a \dot{\theta} + k_a \theta = 0 \quad (15)$$

These two equations describe the dynamics of the absorber and the primary system for a given position of the sliding block.

Non-Dimensionalization Process
Non-Dimensional Model:

To derive the non-dimensional equations, Equations (14) and (15) are divided by the quantities ($m_p g$) and ($m_p g \delta_p$), respectively. That is:

$$\begin{bmatrix} 1+M_s+\mu & M_s R_s + \mu R_v \\ M_s R_s + \mu R_v & \frac{4}{3}M_s R_s^2 + \mu R_v^2 \end{bmatrix}\begin{bmatrix} Y_p'' \\ \Theta'' \end{bmatrix} = \begin{bmatrix} 2\zeta_p & 0 \\ 0 & 2\zeta_p \nu \end{bmatrix}\begin{bmatrix} Y_p' \\ \Theta' \end{bmatrix} + \begin{bmatrix} 1 & 0 \\ 0 & \eta \end{bmatrix}\begin{bmatrix} Y_p \\ \Theta \end{bmatrix} = \begin{bmatrix} F \\ 0 \end{bmatrix} \quad (16)$$

Equation (16) is function of a dimensionless parameter $R_v$, which can be adjusted to suppress the vibrations of the primary system. The dimensionless parameters of Equation (16) are classified into two main categories: system constants which are related to the physical parameters (Table 1), and system variables which are related to the displacements and excitation forces (Table 2). Note that $\omega_p$ is the natural frequency of the primary system defined as $$\omega_p = \sqrt{\frac{k_p}{m_p}} \quad \text{and } ()'$$

is the derivative of the quantity ( ) with respect to t' defined by $t' = \omega_p t$ and $$\delta_p = \frac{m_p g}{k_p}.$$

TABLE 1

Dimensionless System Constant Parameters

| Parameter | Description | Definition |
| --- | --- | --- |
| $M_s$ | Absorber Rod Mass Ratio | $\dfrac{m_s}{m_p}$ |
| $\mu$ | Moving Block Mass Ratio | $\dfrac{m_v}{m_p}$ |
| $\eta$ | Absorber Stiffness Ratio | $\dfrac{k_a}{\delta_p^2 k_p}$ |
| $\nu$ | Absorber Damping Ratio | $\dfrac{c_a}{\delta_p^2 c_p}$ |

TABLE 1-continued

Dimensionless System Constant Parameters

| Parameter | Description | Definition |
| --- | --- | --- |
| $R_s$ | Absorber Rod Center of Gravity | $\dfrac{r_s}{\delta_p}$ |
| $\zeta_p$ | Primary System Damping Ratio | $\dfrac{c_p}{2\sqrt{m_p k_p}}$ |

TABLE 2

Dimensionless System Variable Parameters

| Primary System Variables | | Absorber Variables | | | |
| --- | --- | --- | --- | --- | --- |
| Parameter | Definition | Parameter | Definition | Parameter | Definition |
| $Y_p$ | $\dfrac{y_p}{\delta_p}$ | $\Theta$ | $\theta$ | $R_v$ | $\dfrac{r_v}{\delta_p}$ |
| F | $\dfrac{f}{m_p g}$ | $\Theta_d$ | $\theta_d$ | | |

Steady State Response:

In Equation (16), the non-dimensional excitation force F, is assumed to be harmonic of the form:

$$F = A_F e^{i\Omega t'} \quad (17\text{-a})$$

With the non-dimensional excitation frequency defined as, $$\Omega = \frac{\omega}{\omega_p},$$

($\omega$ is the excitation frequency) and $A_F$ is the excitation amplitude. The resulting primary system non-dimensional displacement, $Y_p$, and the absorber angle $\Theta$ is also harmonic and their amplitude are $A_{Y_p}$, $A_\Theta$, respectively. Hence:

$$\begin{bmatrix} Y_p \\ \Theta \end{bmatrix} = \begin{bmatrix} A_{Y_p} \\ A_\Theta \end{bmatrix} e^{i(\Omega t' + \Psi)} \quad (17\text{-b})$$

where $\Psi$ is the phase angle for a damped primary system. This angle is equal to zero for the undamped primary system. Substituting Equation (17) into Equation (16), the following two equations are obtained:

$$\begin{bmatrix} 1-\Omega^2(1+M_s+\mu)+i2\Omega\zeta_p & -\Omega^2(M_sR_s+\mu R_v) \\ -\Omega^2(M_sR_s+\mu R_v) & \eta-\Omega^2\left(\frac{4}{3}M_sR_s^2+\mu R_v^2\right)+i2\zeta_p\Omega v \end{bmatrix}\begin{bmatrix} A_Y \\ A_\Theta \end{bmatrix} = \begin{bmatrix} A_F \\ 0 \end{bmatrix} \quad (18)$$

or $$\begin{bmatrix} A_Y \\ A_\Theta \end{bmatrix} = \begin{bmatrix} 1-\Omega^2(1+M_s+\mu)+i2\Omega\zeta_p & -\Omega^2(M_sR_s+\mu R_v) \\ -\Omega^2(M_sR_s+\mu R_v) & \eta-\Omega^2\left(\frac{4}{3}M_sR_s^2+\mu R_v^2\right)+i2\zeta_p\Omega v \end{bmatrix}^{-1}\begin{bmatrix} A_Y \\ 0 \end{bmatrix} \quad (19)$$

Equation (19) can be used to solve for amplitude $A_Y$ and $A_\Theta$ for non-dimensional excitation frequency $\Omega$, and sliding block location, $R_v$.

Absorber Tuning Process

Absorber Tuning Law:

To develop the absorber tuning law, the damping ratio is set, $\zeta_p=0$ and $\zeta_a=0$, in Equation (19). That is:

$$\begin{bmatrix} A_Y \\ A_\Theta \end{bmatrix} = \begin{bmatrix} 1-\Omega^2(1+M_s+\mu) & -\Omega^2(M_sR_s+\mu R_v) \\ -\Omega^2(M_sR_s+\mu R_v) & \eta-\Omega^2\left(\frac{4}{3}M_sR_s^2+\mu R_v^2\right) \end{bmatrix}^{-1}\begin{bmatrix} A_F \\ 0 \end{bmatrix} \quad (20)$$

Using Equation (20), one can deduce that the amplitude of the steady state vibration of primary system $A_Y$ is zero if:

$$\eta - \Omega^2\left(\frac{4}{3}M_sR_s^2+\mu R_v^2\right) = 0 \quad (21)$$

Equation (21) is divided by $\eta$, and let $$\beta^2 = \frac{\eta}{\left(\frac{4}{3}M_sR_s^2+\eta R_v^2\right)} \quad (22)$$

to get:

$$\beta = \Omega$$

$\beta$ is referred to as the absorber non-dimensional natural frequency in this work. Equation (22) is the tuning law and it states that if the non-dimensional natural frequency of the absorber $\beta$ is set equal to the non-dimensional excitation frequency $\Omega$, then the amplitude $A_Y$ of the undamped steady state vibration of the primary system is zero. This state is referred to as the tuned state in which the following relation holds:

$$\mu R_v^2 + \frac{4}{3}M_sR_s^2 = \frac{\eta}{\beta^2} \quad (23)$$

or $$R_v = \sqrt{\frac{1}{\mu}\left(\frac{\eta}{\beta^2}-\frac{4}{3}M_sR_s^2\right)}$$

Equations (22) and (23) are substituted into Equation (20) to get:

$$\begin{bmatrix} A_Y \\ A_\Theta \end{bmatrix} = \begin{bmatrix} 1-\Omega^2(1+M_s+\mu)+i2\Omega\zeta_p & -\Omega^2\left(M_sR_s+\sqrt{\mu\left(\frac{\eta}{\Omega^2}-\frac{4}{3}M_sR_s^2\right)}\right) \\ -\Omega^2\left(M_sR_s+\sqrt{\mu\left(\frac{\eta}{\Omega^2}-\frac{4}{3}M_sR_s^2\right)}\right) & i2\zeta_p\Omega v \end{bmatrix}\begin{bmatrix} A_F \\ 0 \end{bmatrix} \quad (24)$$

Equation (24) is divided by $A_F$ and solved for $$\frac{A_Y}{A_F}$$

and $$\frac{A_\Theta}{A_F}.$$

That is:

$$\begin{bmatrix} \frac{A_Y}{A_F} \\ \frac{A_\Theta}{A_F} \end{bmatrix} = \begin{bmatrix} 1-\Omega^2(1+M_s+\mu)+i2\Omega\zeta_p & -\Omega^2\left(M_sR_s+\sqrt{\mu\left(\frac{\eta}{\Omega^2}-\frac{4}{3}M_sR_s^2\right)}\right) \\ -\Omega^2\left(M_sR_s+\sqrt{\mu\left(\frac{\eta}{\Omega^2}-\frac{4}{3}M_sR_s^2\right)}\right) & i2\zeta_p\Omega v \end{bmatrix}^{-1}\begin{bmatrix} 1 \\ 0 \end{bmatrix} \quad (25)$$

The expression for $$\frac{A_Y}{A_F}$$

and $$\frac{A_\Theta}{A_F}$$

are the transfer functions for the VIVA. Manipulating these transfer functions gives the difference of the phase angles of the absorber vibration and that of the primary system as follows:

$$[-\Omega^2(M_s R_s + \mu R_v)]A_Y + \left[\eta - \Omega^2\left(\frac{4}{3}M_s R_s^2 + \mu R_v^2\right) + i2\zeta_p\Omega v\right]A_\Theta = 0 \quad (26)$$

which gives:

$$\frac{A_\Theta}{A_Y} = \frac{\eta - \Omega^2\left(\frac{4}{3}M_s R_s^2 + \mu R_v^2\right) + i2\zeta_p\Omega v}{-\Omega^2(M_s R_s + \mu R_v)}$$

At the tuned position $\beta=\Omega$, Equation (26) reduces to:

$$\frac{A_\Theta}{A_Y} = \frac{2\zeta_p\Omega v}{-\Omega^2(M_s R_s + \mu R_v)}i \quad (27)$$

Equation (27) suggests that the difference of the phase angle $$\left(\text{angle of } \frac{A_\Theta}{A_Y}\right)$$

is 90° at the tuned position $\beta=\Omega$. This criterion can be used to detect the tuned position of the moving block.

Design Procedure for Absorber Tuning Process:

The design procedure determines the absorber parameters: (the sliding block mass, $m_v$, and the vibration absorber stiffness, $k_a$) for which vibration suppression of the primary system is achieved. The inputs to design calculations are:
  (1) the excitation frequency bandwidth $[\omega_{min}, \omega_{max}]$,
  (2) the limits of travel of the tuning block, $[(r_v)_{min}, (r_v)_{max}]$, and
  (3) the primary system parameters, $k_p$, $c_p$ and $m_p$ Using the input listed above, the non-dimensional parameters are calculated, and substituted into equation $$\eta = R_v^2\Omega^2\mu + \frac{4}{3}M_s R_s^2\Omega^2 \text{ to get:}$$

$$\eta = (R_v)_{min}^2(\Omega_{max})^2\mu + \frac{4}{3}M_s R_s^2(\Omega_{max})^2 \quad (28)$$

$$\eta = (R_v)_{max}^2(\Omega_{min})^2\mu + \frac{4}{3}M_s R_s^2(\Omega_{min})^2 \quad (29)$$

Equations (29) and (30) present a system of two linear algebraic equations in two unknowns ($\mu$ and $\eta$), which are the mass ratio and the stiffness ratio of the absorber. Computation of these two parameters gives the required values for absorber mass and stiffness.

Figure 10:
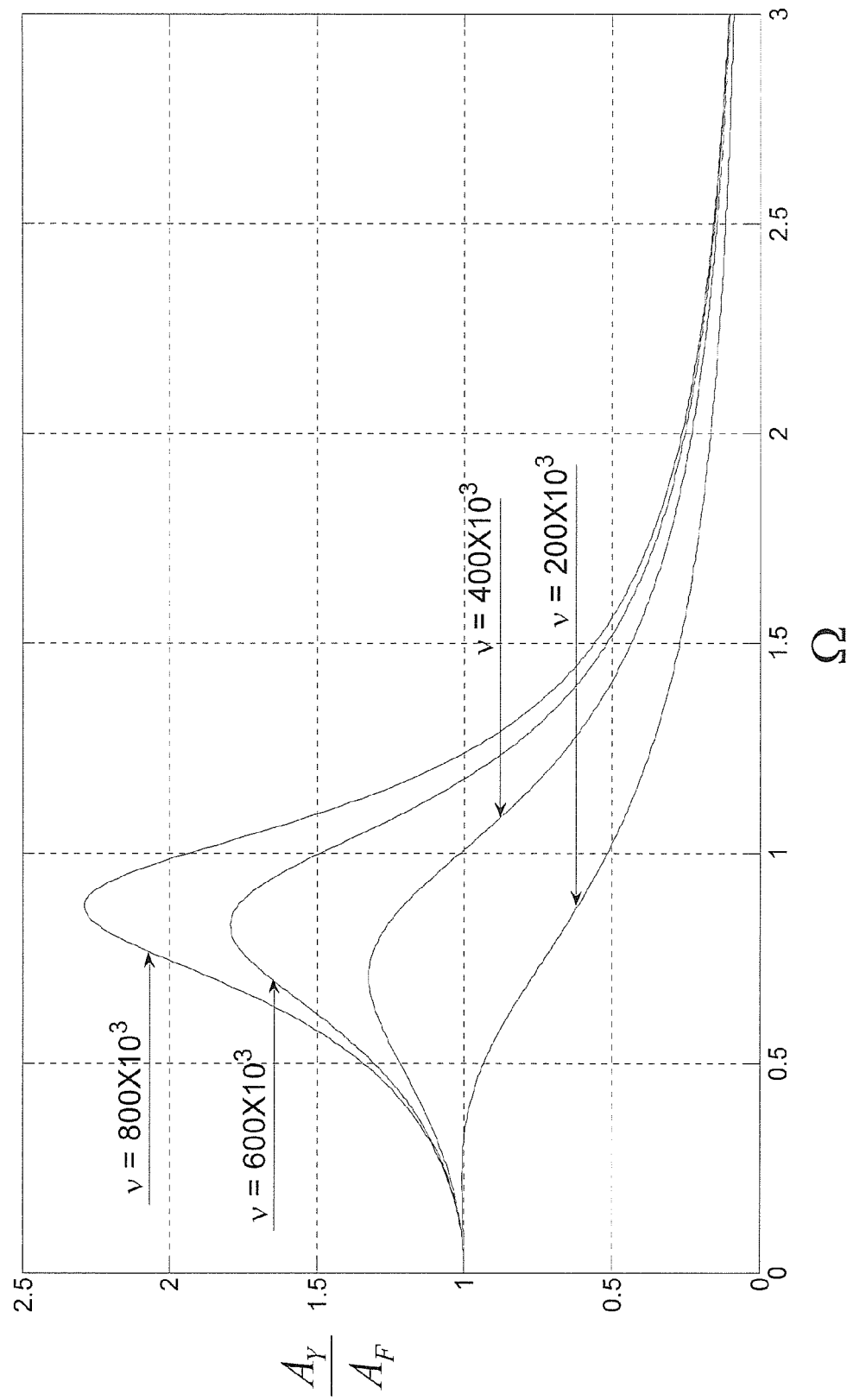
FIG. 10 is a graph showing the damping effect on the primary mass response.

Effect of Ratio of Damping Ratios:

To study the effect of the ratio of damping ratio, v, on the system performance, a system with non-dimensional parameters values of $M_s=0.08$, $R_s=270$, $\mu=0.06$ and $\eta=80\times10^3$ is arbitrary selected. The damping ratio of the main system used is arbitrary chosen 0.01 ($\zeta_p=0.01$). The transfer function, $$\frac{A_Y}{A_F}$$

for several values of v is calculated and plotted in FIG. 10. As can be seen, the lower the absorber damping, the better is the vibration suppression. Also note that deterioration of damping is more pronounced near the resonant frequency of the primary system ($\Omega=1$).

VIVA Performance

The effectiveness of a VIVA was compared to that of Den Hartog optimal vibration absorber is presented. Also the transfer function of the primary system with no absorber is reported as a reference, in Equation (30).

$$\frac{A_Y}{A_F} = \frac{1}{1 - \Omega^2 - i2\zeta_p\Omega} \quad (30)$$

For the sake of completeness, the design procedure for Den Hartog optimal vibration absorber is briefly presented. The steps are:

Step 1: Choose the mass ratio $\mu'$. This mass ratio is set equal to the sum of the mass of the absorber rod and mass of the tuning block to the mass of the primary system.

Step 2: Calculate $\beta$ and $\xi_a$ using Equation (31) and (32)

$$\beta = \frac{1}{1+\mu'} \quad (31)$$

$$\zeta_a = \frac{3\mu'}{8(1+\mu')} \quad (32)$$

Step 3: Compute the transfer function of the vibration of the primary system with Den Hartog optimal vibration absorber using Equation (33).

$$\frac{A_Y}{A_F} = \sqrt{\frac{(\beta^2 - \Omega^2)^2 + (2\zeta_a\beta\Omega)^2}{((1-\Omega^2)(\beta^2 - \Omega^2) - \mu'\beta^2\Omega^2)^2 + (2\zeta_a\beta\Omega)^2(1-\Omega^2(1+\mu'))^2}} \quad (33)$$

Figure 11:
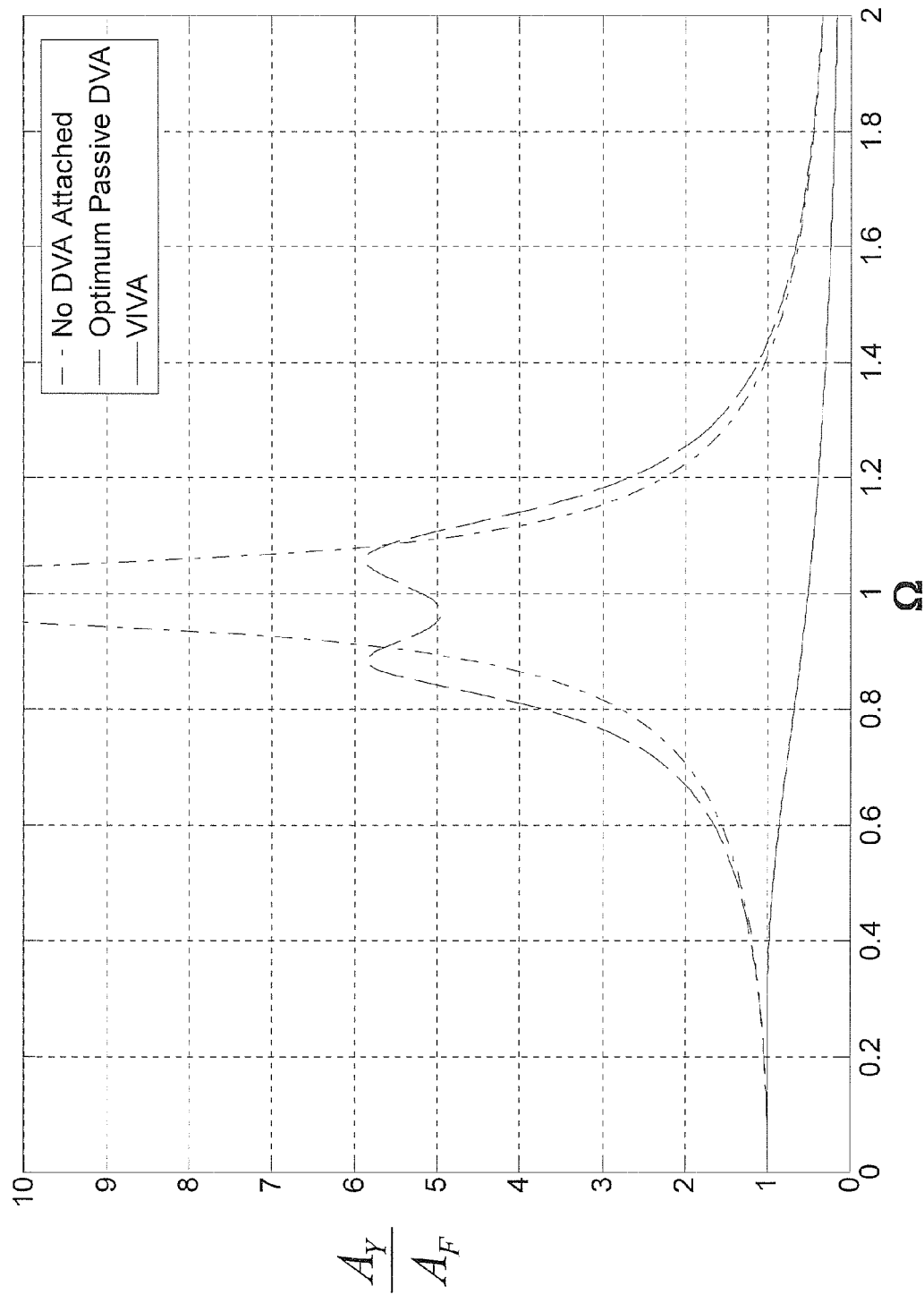
FIG. 11 is a graph of the performance comparison of a mechanical system with VIVA, optimum passive DVA, and no DVA attached.

FIG. 11 shows the transfer function of the vibration of the primary system with no absorber, with VIVA, and with Den Hartog optimal vibration absorber. It is clear that the performance of VIVA is much better than the Den Hartog optimal vibration absorber.

A non-dimensional form of the equations of motion of VIVA was developed and used to formulate a tuning law for vibration suppression of the primary system. This tuning law was based on the phase difference between the absorber and primary system acceleration signals. The phase difference is found to be 90° and was used to construct a design procedure whereby the stiffness and mass of the tuning block are determined for a given excitation frequency band. A parametric study was conducted and it was shown that the absorber damping adversely affects the performance of the VIVA.

Examples

Experimental Set-Up

Figure 12:
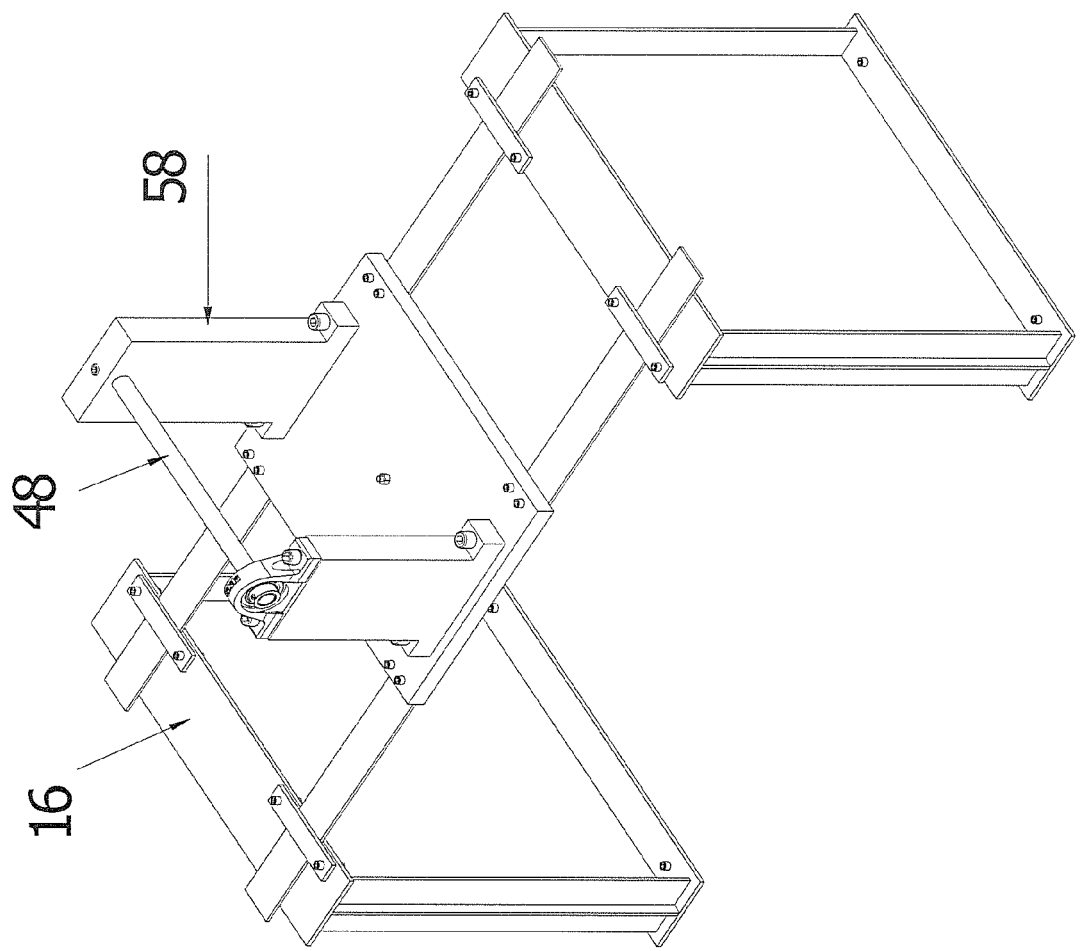
FIG. 12 is a photograph of the primary system.
Figure 13:
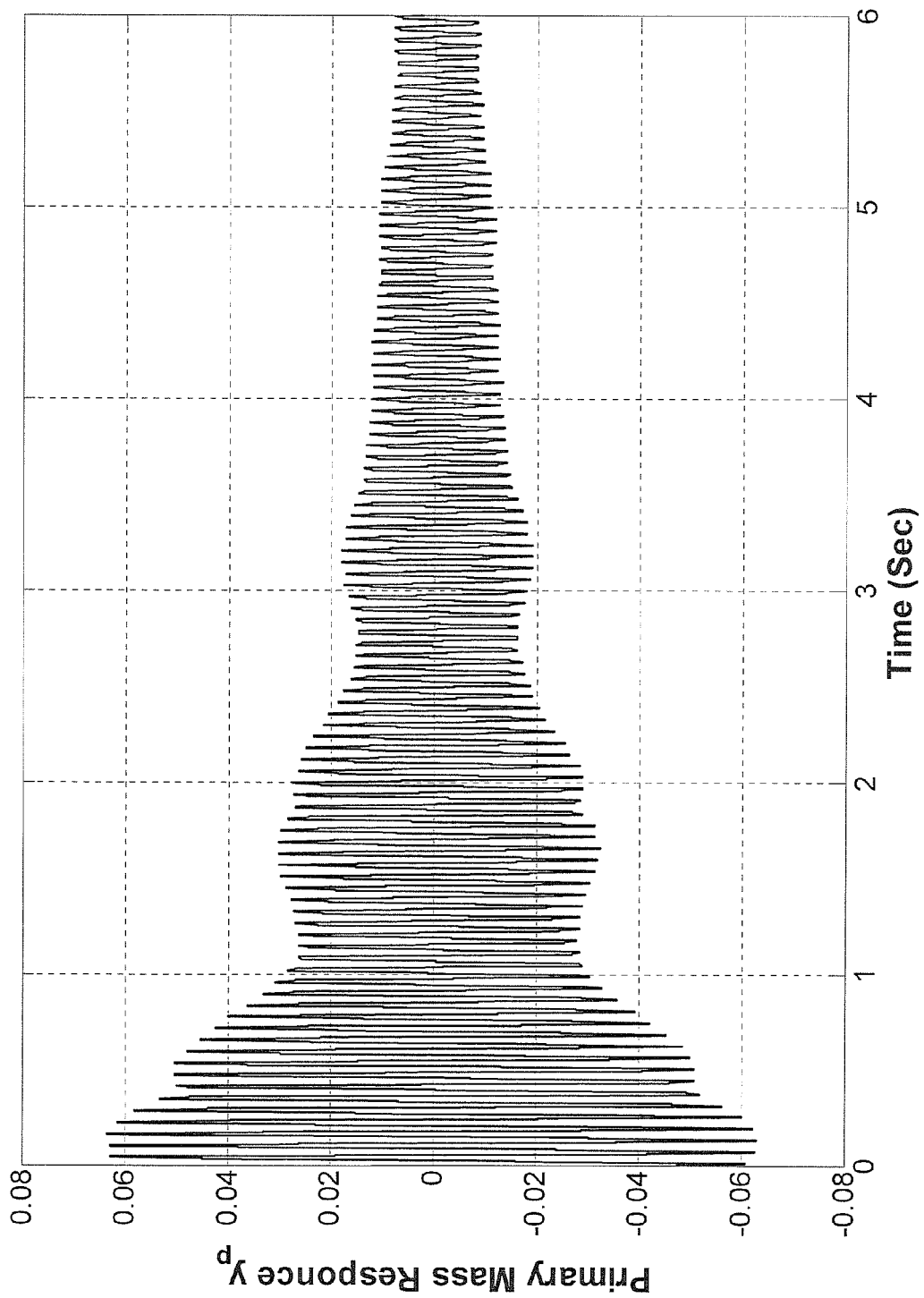
FIG. 13 is a graph of free vibration response of the primary system.

Primary System Parameters:

FIG. 12 shows the developed primary system of mass 14.32 Kg. A free vibration test was performed and it was found that its natural frequency was approximately 16.4 Hz. Using the mass and natural frequency of the primary system, its stiffness was found to be 152181.8 N/m. FIG. 13 shows the primary system free response corresponding to an impulse input. The oscillations in the primary system free response show that it is a multi DOF system. To approximately determine the damping of the first mode, the logarithmic decrement is applied to the trailing edge of the primary system response where the higher modes are damped out using:

$$\delta = \frac{1}{n}\ln\left(\frac{y_1}{y_{n+1}}\right) \ \& \ \zeta = \frac{\delta}{\sqrt{(2\pi)^2 + \delta^2}} \quad (34)$$

where n is the number of cycles and $y_i$ is the amplitude of the $i^{th}$ cycle. The damping ratio of primary system is found to be 0.001. The primary system parameters are reported in Table 3.

TABLE 3

Primary System Parameters

| Parameter | Description | Value |
|---|---|---|
| $m_p$ | Primary System Mass | 14.32 kg |
| $\omega_p$ | Primary System Natural Frequency | 103.08 rad/s |
| $k_p$ | Primary System Stiffness | 152181.8 N/m |
| $\zeta_p$ | Primary System Approximated Damping Ratio | 0.001 |

Figure 14:
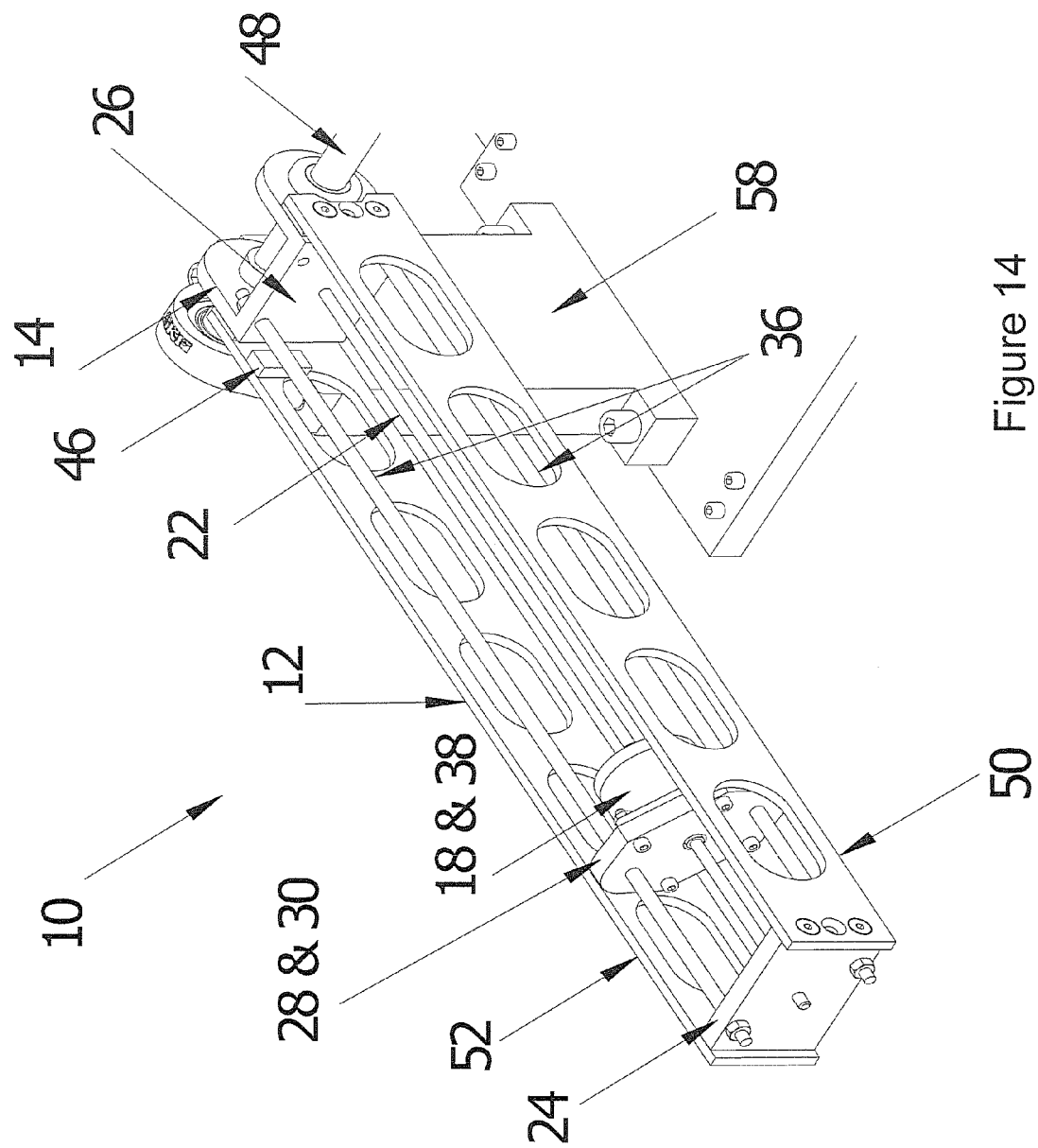
FIG. 14 is a photograph of the carrier rod assembly.

Vibration Absorber Parameters:

FIG. 14 shows the vibration absorber rod structure (i.e. carrier rod assembly 12) used in the set-up. It has a 1.945 Kg mass and of 0.635 m long. Table 4 summarizes the absorber rod parameters. The range of sliding block motion is 0.108 m-0.546 m measured from the absorber rod pivot. The excitation frequency bandwidth, for which the absorber rod is designed, is arbitrary selected to be (13.77 Hz-19 Hz).

TABLE 4

Absorber Parameters

| Parameter | Description | Value |
|---|---|---|
| $m_s$ | Absorber rod mass | 1.945 kg |
| $l_s$ | Absorber rod length | 0.635 m |
| $r_s$ | Distance between the rotation centre of the absorber rod and its centre of mass | 0.318 m |

Design Procedure for Absorber Tuning Process:

The procedure calculated the tuning block mass, $m_v$, and the vibration absorber stiffness, $k_a$, for which vibration suppression of the primary system can be achieved. For simulation and experimentation purposes, the following parameters were arbitrarily selected and/or measured experimentally:

(4) the excitation frequency band width [$\omega_{min}$, $\omega_{max}$],
(5) the limits of travel of the tuning block, [$(r_v)_{min}$, $(r_v)_{max}$], and
(6) the primary system parameters, $k_p$, $c_p$ and $m_p$ Using the above parameter, the non-dimensional parameters are calculated. Recall that at the tuned state there is included:

$$\eta = R_v^2 \Omega^2 \mu + \frac{4}{3} M_s R_s^2 \Omega^2$$

[$(\Omega)_{max}$, $(R_v)_{min}$] and [$(\Omega)_{min}$, $(R_v)_{max}$] are substituted into the above equation to get:

$$\eta = (R_v)_{min}^2 (\Omega_{max})^2 \mu + \frac{4}{3} M_s R_s^2 (\Omega_{max})^2 \quad (35)$$

$$\eta = (R_v)_{max}^2 (\Omega_{min})^2 \mu + \frac{4}{3} M_s R_s^2 (\Omega_{min})^2 \quad (36)$$

Equations (35 and 36) present a system of two linear algebraic equations in two unknowns ($\mu$ and $\eta$), which are the mass ratio and the stiffness ratio of the absorber. Calculating these two parameters results in the mass ratio, $\mu$, and the stiffness ratio, $\eta$. Substituting the values of the absorber parameters given in Table 5 into the design equations (35 & 36), the following linear relations are obtained:

$$\eta = 246870\mu + 15132 \ \& \ \eta = 18420\mu + 28858 \quad (37)$$

The solution of the above relation gives mass ratio ($\mu$=0.06) and the stiffness ratio ($\eta$=29965). Hence, the absorber tuning block mass is 0.8604 kg and a torsional stiffness of absorber is 3887 Nm/rad. Based on the design input parameters reported in Tables (3 and 4), the non-dimensional parameters are calculated and reported in Table 5.

TABLE 5

Dimensionless Parameters

| Parameter | Description (Nondimensional) | Value |
|---|---|---|
| $M_s$ | Absorber Rod Mass | 0.136 |
| $R_s$ | Distance between the rotation centre of the absorber rod and its centre of mass | 343.9 |
| $\Omega\|_{min}$ | Minimum Operating Frequency | 0.84 |
| $\Omega\|_{max}$ | Maximum Operating Frequency | 1.16 |
| $R_v\|_{min}$ | Minimum Sliding Block Location | 117 |
| $R_v\|_{max}$ | Maximum Sliding Block Location | 591.5 |

Figure 15:
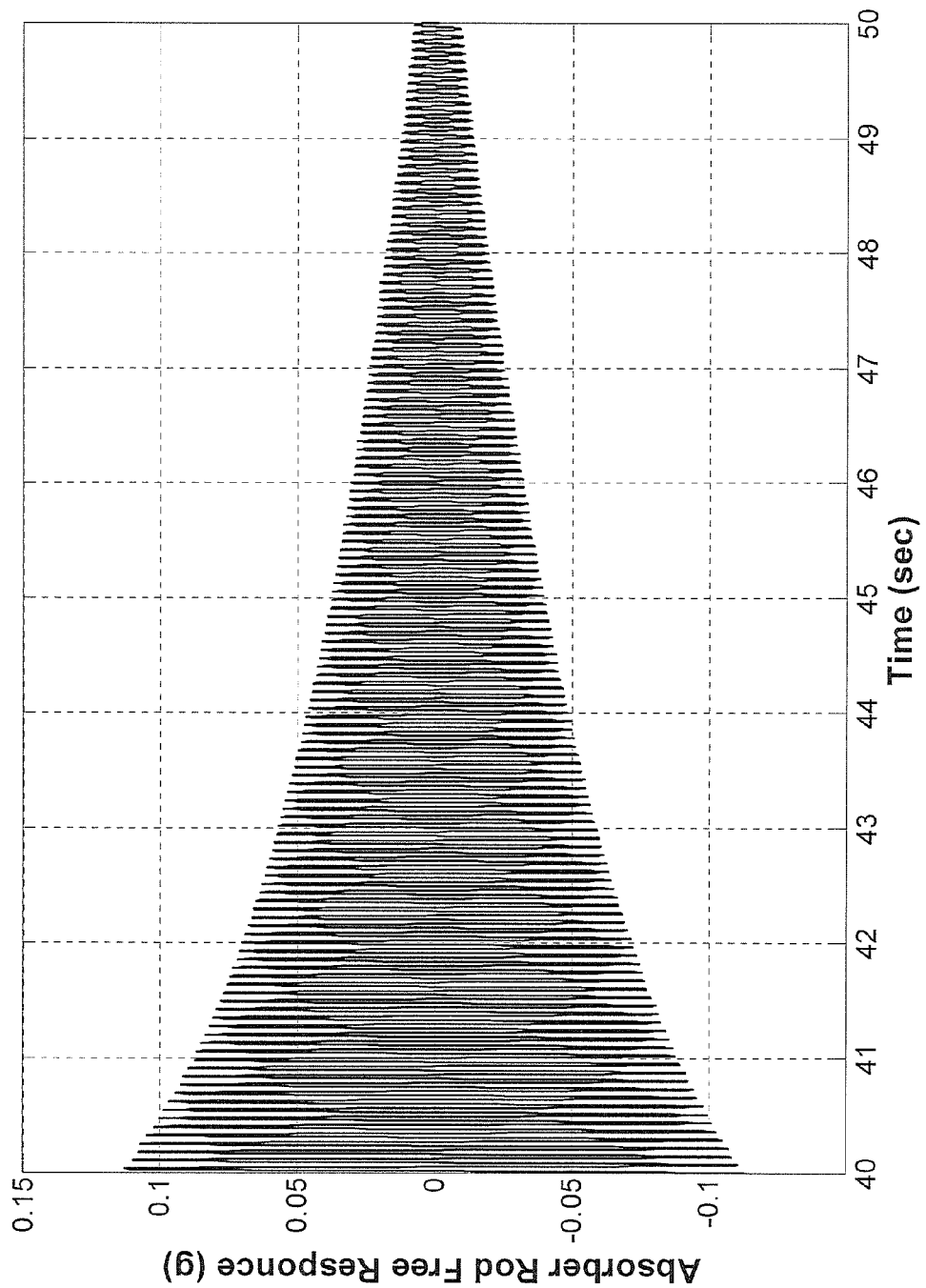
FIG. 15 is a graph of free vibration response of the self-tuned vibration absorber.

Estimation of Absorber Damping:

FIG. 15 shows the absorber free vibration response with the sliding block at the far end of the absorber rod ($r_v$=0.546 m). The data and the logarithmic decrement method are used and absorber damping, $c_a$, is computed. It is found to be, $c_a$=0.223 Nms/rad.

Control Procedure

Figure 16:
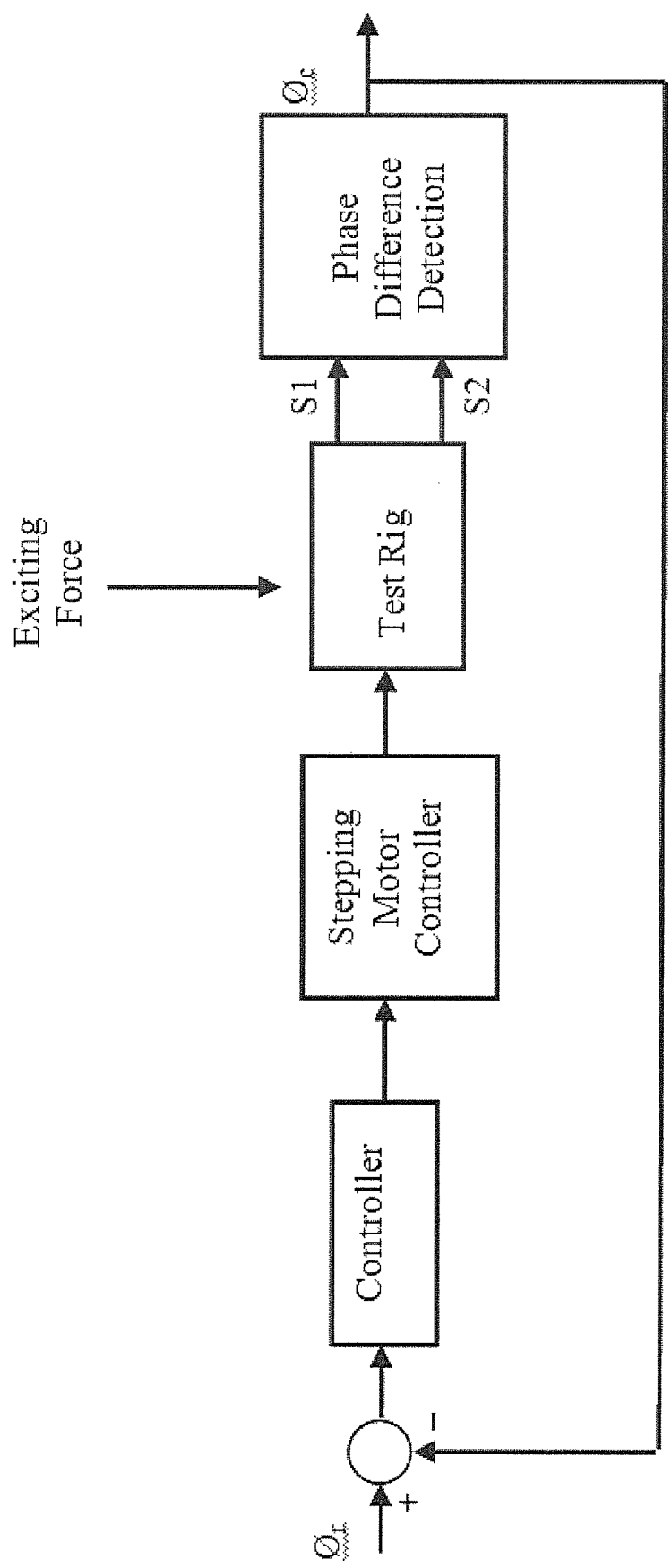
FIG. 16 is a block diagram.

The controller objective is to move the tuning block to the tuned position on the absorber rod. Recall that the phase angle between the primary system and the absorber rod vibration is 90° at the tuned position. To achieve this goal, the control system block diagram of FIG. 16 is used. This control scheme consists of a test rig, phase computation block, controller, and stepping motor controller. The controller is a proportional controller with a gain of 600. $\phi_r$ is the desired phase difference and $\phi_c$ is the current phase difference. $S_1$ and $S_2$ are accelerometer signals.

Figure 17:
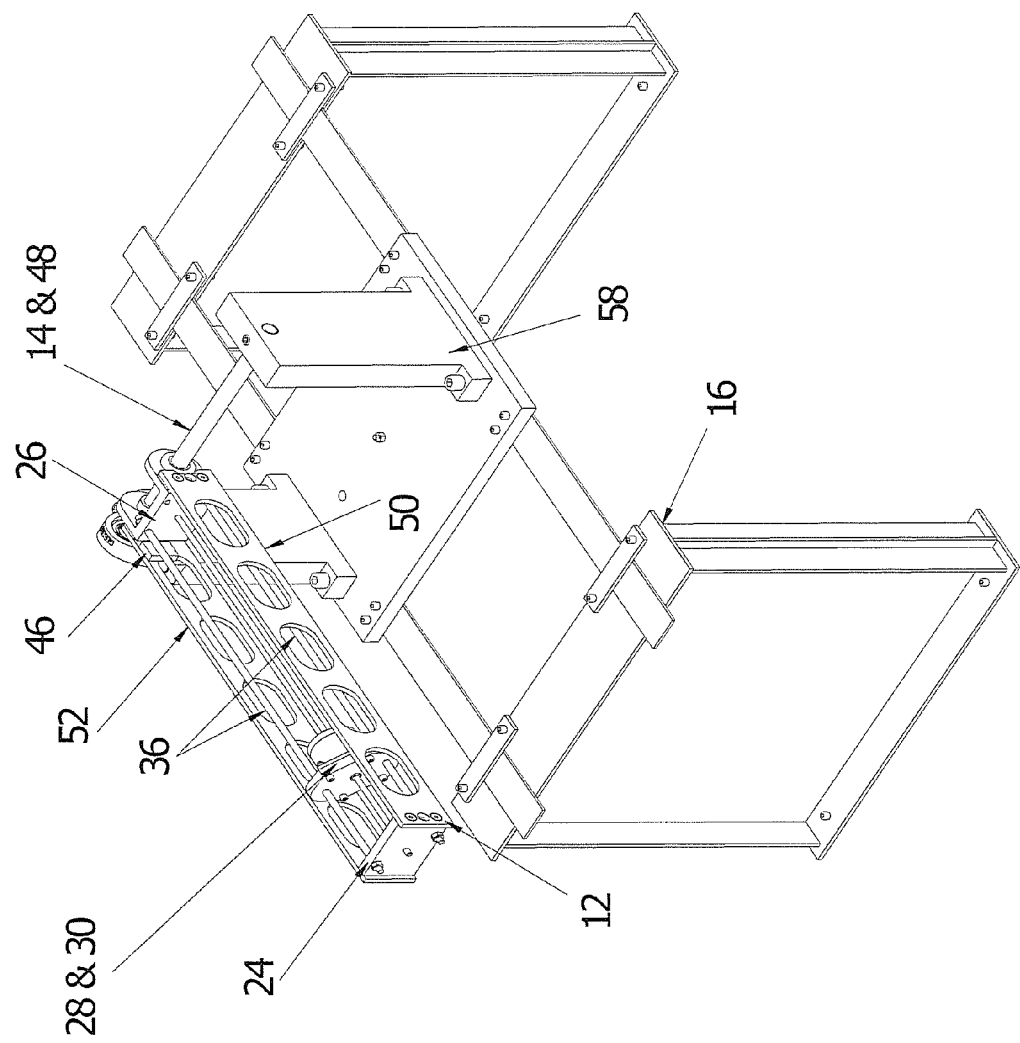
FIG. 17 is a photograph of a test rig.

Test Rig (FIG. 17):

The test rig block represents the dynamic model of the primary system and absorber. Its inputs are the excitation force and the sliding block velocity and the outputs are the acceleration of the primary system and absorber rod as measured by two accelerometers ($S_1$ and $S_2$). In addition to the test rig structure, the following components are used, a linear actuator, which is a stepping motor with a lead screw; two accelerometers, one at the center of the primary mass and one at the tip of the vibration absorber rod; two limit switches, one at each extreme location, the limit switches turn off the motor once the tuning block reached the end of its travel in either direction; and a computer interface system, to read the signals from the transducers and to send the driving signals to the stepping motor.

Figure 18:
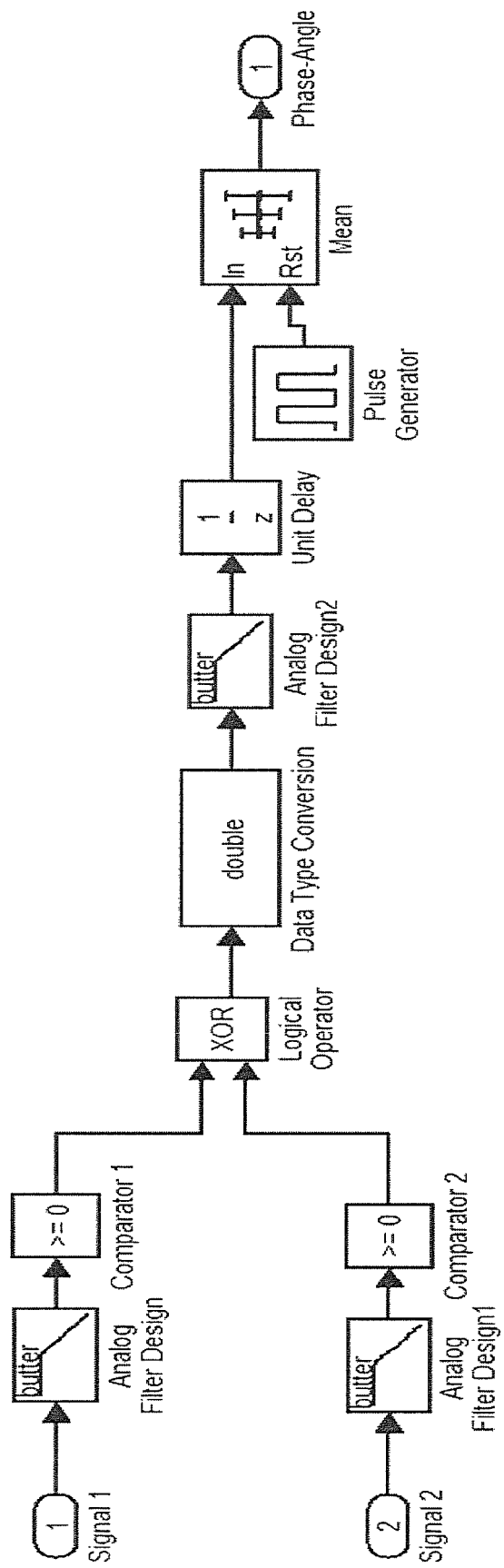
FIG. 18 is a block diagram of phase difference detection.

Phase Computation:

The phase difference computation block receives the test-rig outputs as input and calculates the phase difference between them. An XOR phase difference computation procedure is implemented. FIG. 18 shows the block diagram of the phase difference computation process. Signals 1 and 2 are the accelerometer signals at the primary mass and the difference of accelerometer readings at absorber rod tip and primary mass, respectively. The signal processing entailed in this block are: filtering high frequency noise using low pass filter, transforming the signals to rectangular forms of 0V to 5V using comparators, computing the average of the output of exclusive or-logic operations on the two signals. The output of this computation is the map of phase difference interval of [0°, 180°] to [0, 1]. This means that the phase difference 90° corresponds to 0.5.

Figure 19:
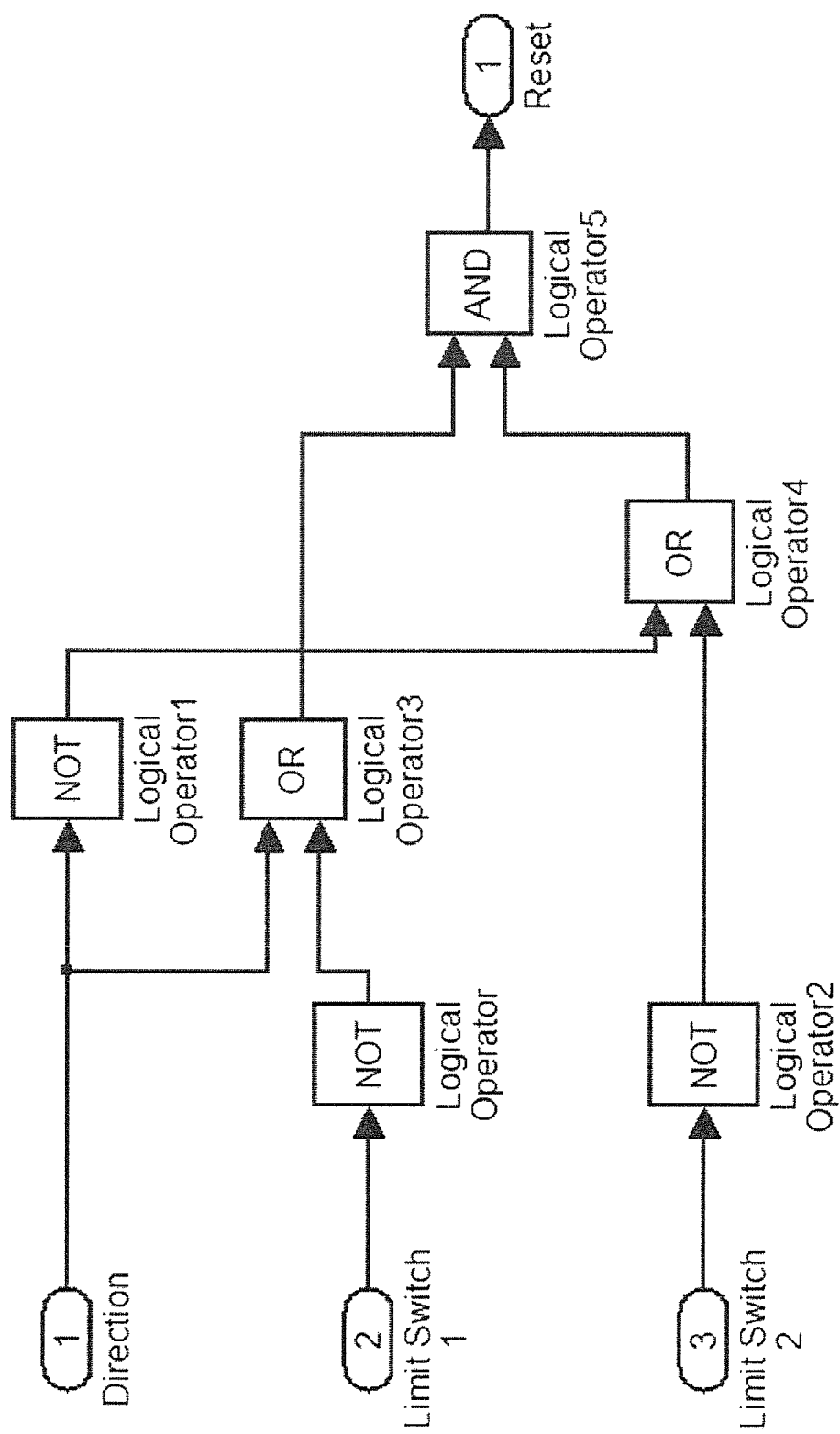
FIG. 19 is a block diagram of stepper motor control.
Figure 20:
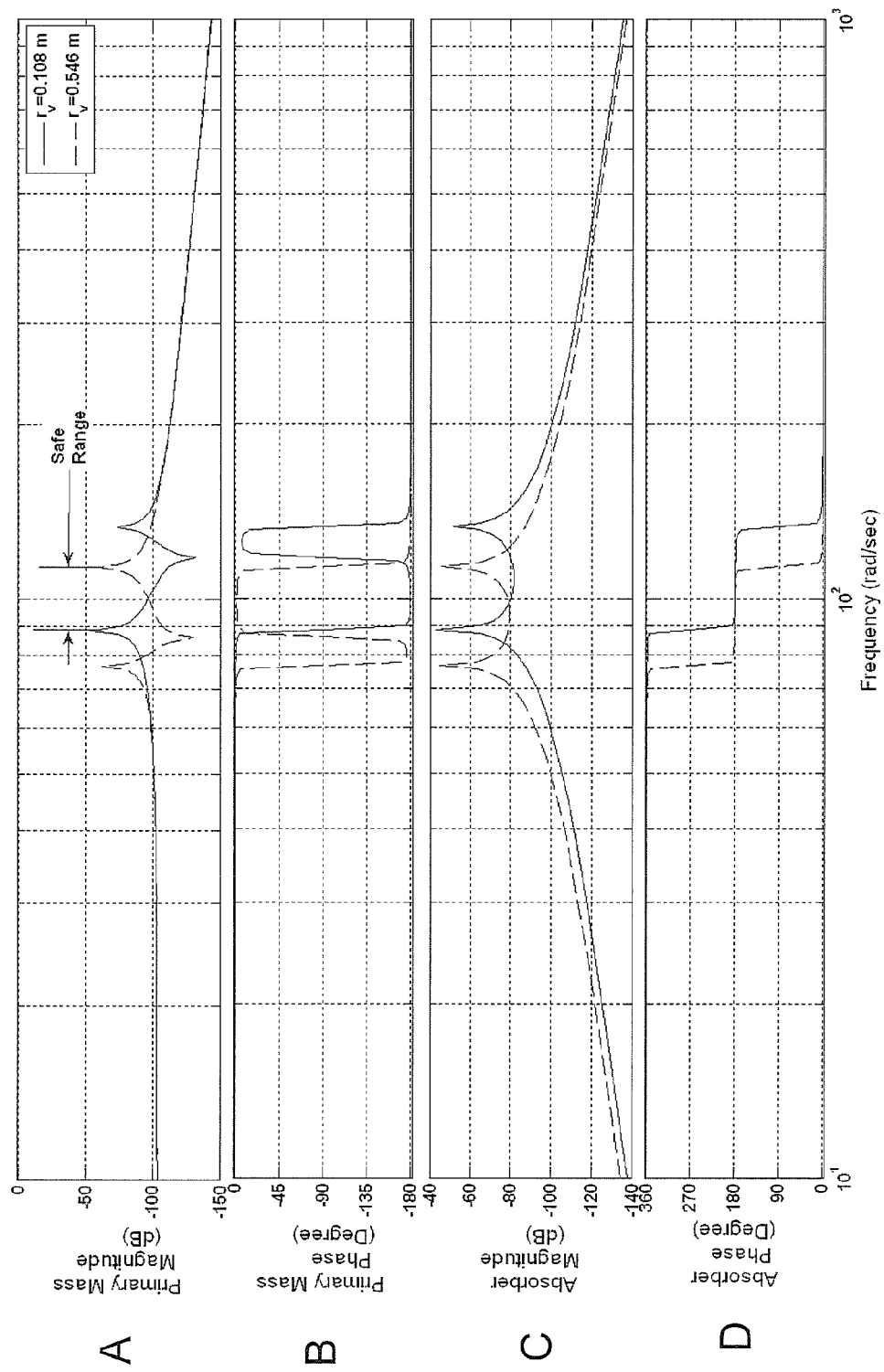
FIG. 20A is a Bode plot of primary mass magnitude.
FIG. 20B is a Bode plot of primary mass phase.
FIG. 20C is a Bode plot of absorber magnitude.
FIG. 20D is a Bode plot of absorber phase.
Figure 21:
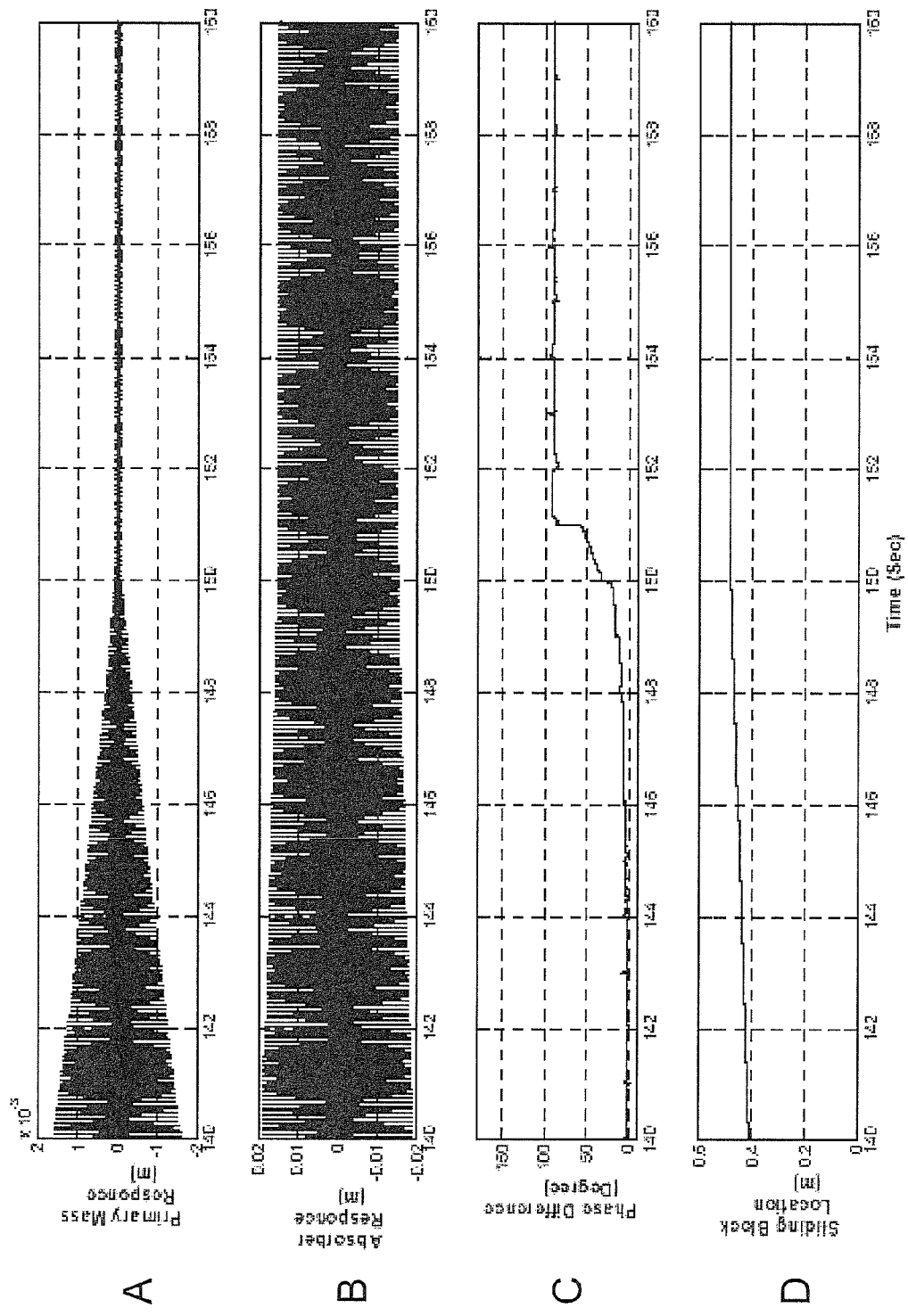
FIG. 21A is a graph of primary mass response versus time.
FIG. 21B is a graph of absorber response versus time.
FIG. 21C is a graph of phase difference versus time.
FIG. 21D is a graph of sliding block location versus time.

Stepping Motor Controller:

The stepping motor controller block is introduced to achieve two goals. The first goal is to take the controller output and generate the pulse train proportional to the deviation of the phase difference from 90°, a direction signal to move the tuning block up or down the absorber rod, and stop the stepping motor when it reaches the limit switches. To achieve the second goal, a logic controller is designed, FIG. 19. This logic controller has three inputs. They are stepping motor direction signal and the two limit switch signals. The logic controller output is the stepping motor reset signal. If this signal is true then the driving pulse is send to the stepping motor. Note that this logic controller activates the stepping motor if it is moving between the two limit switches and stops the motor if the motor goes beyond the limit switches.

Simulation Results

The simulation results are reported using the system parameters given in the Tables 3 and 4. The system Bode plot, numerically generated, for two extreme positions of the tuning block is reported in FIGS. 20A-20D. A solid line is for the tuning block positioned at the near end ($r_v=0.108$ m), at which the absorber natural frequency is 19 Hz, while the dashed line is for the tuning block positioned at the far end ($r_v=0.546$ m), at which the absorber natural frequency is 13.8 Hz. 13.8-19 Hz is the operating frequency range. As can be seen from FIGS. 20A-20D, at the absorber resonance frequency for each case, the primary system response is significantly reduced while the absorber response is finite. It is clear also that the phase difference between the primary system and the absorber responses is 90° at the tuning position, which is the main idea behind the control of this system.

FIGS. 21A-21D show the simulation results of the system under study. The excitation frequency is set to 14.453 Hz, which is 88% of the Primary system natural frequency. The sliding block, at the beginning of the simulation was at ($r_v=0.108$ m). This means that the initial vibration absorber natural frequency is higher than the excitation frequency. The controller moves the sliding block toward the tuning location at which the phase difference becomes 90°. The tuning position is found to be ($r_v=0.485$ m). It is clear that during simulation the primary system response decreases while the phase difference between the primary system and the absorber changes from 0° to 90°, at which the system reaches the steady state and the primary system vibration becomes very small. The simulation results show a very good vibration reduction effect of the VIVA at the anti resonance point. This validates the control strategy.

Results

Figure 22:
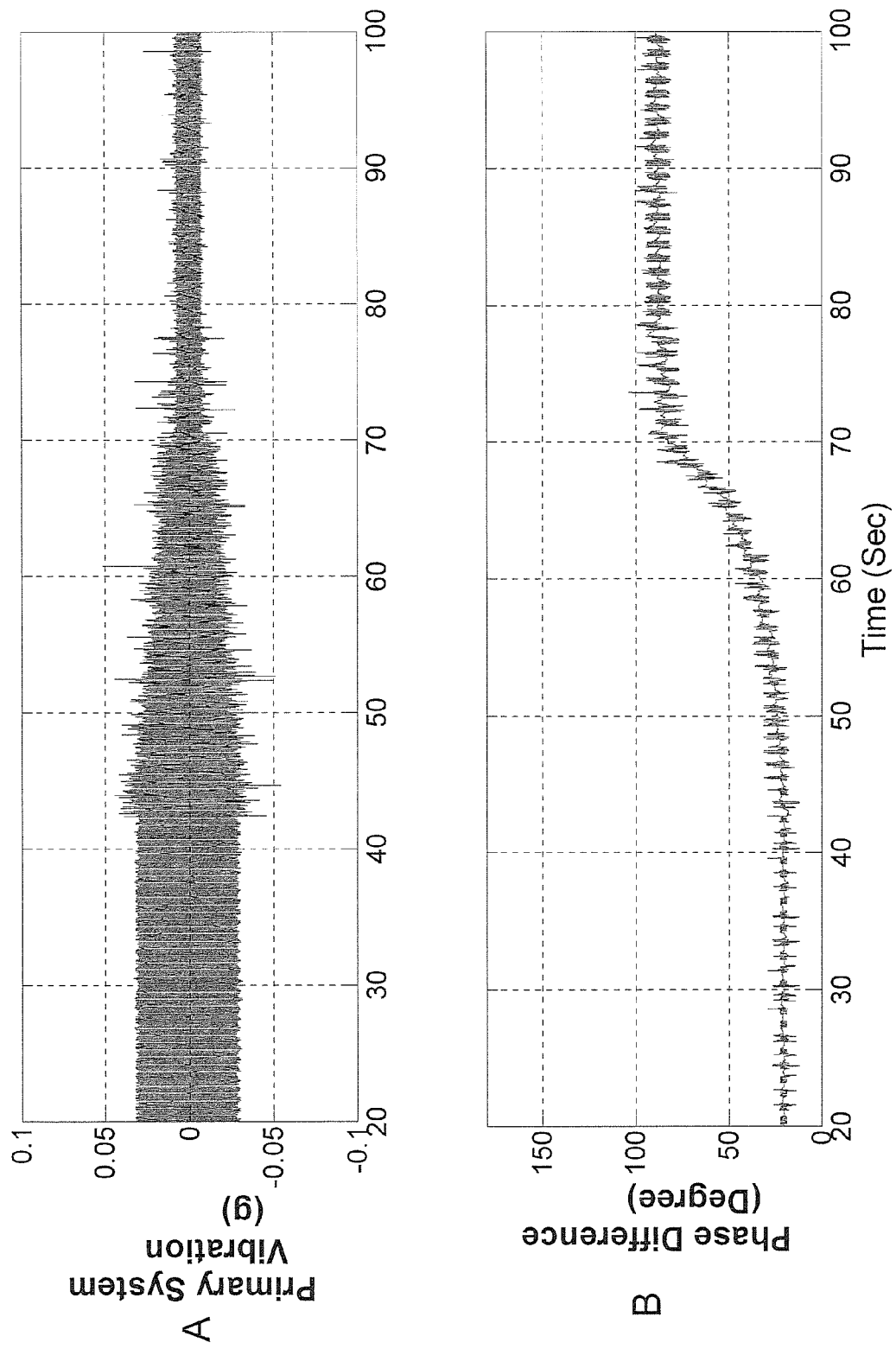
FIG. 22A is a graph of primary system vibration versus time.
FIG. 22B is a graph of phase difference versus time.
Figure 23:
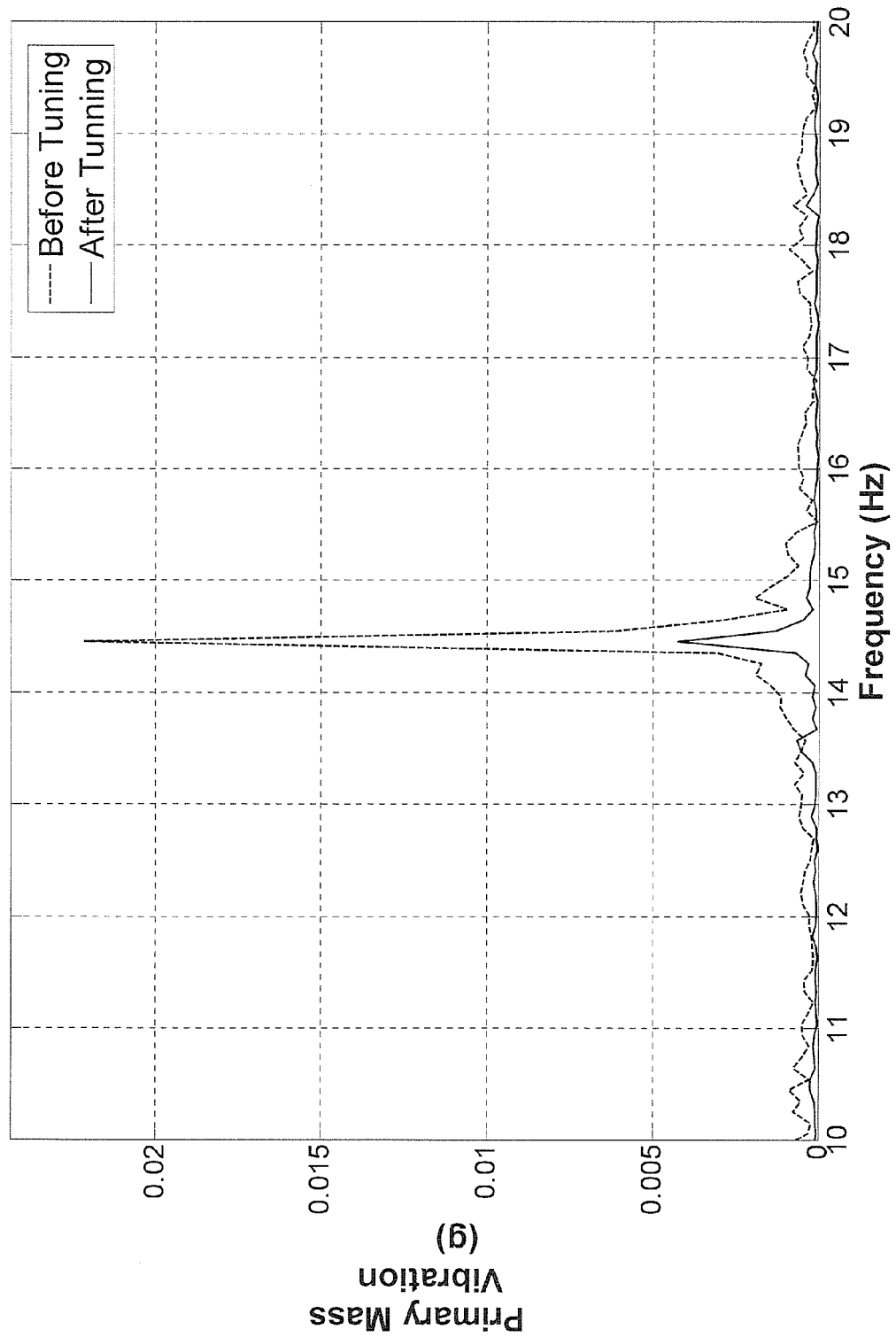
FIG. 23 is a graph of primary system response before and after tuning.

The acceleration measured by the sensor at the tip of the vibration absorber rod is its absolute acceleration. The signal measured by the accelerometer at the primary mass is subtracted from that of at the tip of the vibration absorber rod. This difference is proportional to angular acceleration of the absorber. In this experiment, the sliding block was at $r_v=0.108$ m. The controller moved the block toward the tuned position. Then it stopped the stepping motor when the phase different becomes 90°. The stopping criterion was when the deviation from 90° becomes less than 9°. FIGS. 22A and 22B show the experimental results in the time domain: the acceleration of the primary system (22A) and phase difference (22B). FIG. 23 shows the primary system frequency response at detuned and tuned position. As seen from this FIG. 23, the primary system vibration is reduced to less than 20% of that of detuned state.

CONCLUSIONS

The dynamics of a variable inertia vibration absorber (VIVA) and a tuning procedure are presented in non-dimensional form. The absorber non-dimensional equations and the developed tuning law are used to construct a design procedure whereby the stiffness and mass of the tuning block are determined for a given excitation frequency band. A controller is developed to tune the phase difference between the primary system oscillation and the absorber's to 90°. A test-rig is constructed using the tuning law developed in this study and its effectiveness is experimentally verified. Thus, a novel self-tuning vibration absorber 10 is presented.

Throughout this application, author and year and patents by number reference various publications, including United States patents. Full citations for the publications are listed below. The disclosures of these publications and patents in their entireties are hereby incorporated by reference into this application in order to more fully describe the state of the art to which this invention pertains.

The invention has been described in an illustrative manner, and it is to be understood that the terminology, which has been used, is intended to be in the nature of words of description rather than of limitation.

Obviously, many modifications and variations of the present invention are possible in light of the above teachings. It is, therefore, to be understood that within the scope of the described invention, the invention may be practiced otherwise than as specifically described.

What is claimed is:

1. A self-tuning vibration absorber comprising:
a carrier rod assembly,
said carrier rod assembly including operatively connected thereto mounting means for mounting said carrier rod assembly to a primary system and hollow shafted motorized tuning means for tuning a phase difference between vibration of the primary system and vibration of said carrier rod assembly to 90 degrees, said hollow shafted motorized tuning means is further defined as a motorized tuning mass,
said carrier rod assembly further including detecting means for detecting the vibration of the primary system and the vibration of said carrier rod assembly;
and controller means in electrical connection with said detecting means and said hollow shafted motorized tuning means for controlling said tuning means based on the vibration of the primary system and said vibration of said carrier rod assembly detected and activating movement of said motorized tuning mass so that the phase difference between the primary system and vibration of said carrier rod assembly is 90 degrees and then turning off a motor of said motorized tuning mass.

2. The self-tuning vibration absorber of claim 1, wherein said detecting means is further defined as accelerometers operatively connected to the primary system and said self-tuning vibration absorber.

3. The self-tuning vibration absorber of claim 1, wherein said motorized tuning mass is adjustably attached to a screw rod operatively attached to a first end plate and a second end plate of said carrier rod assembly.

4. The self-tuning vibration absorber of claim 3, wherein said motorized tuning mass is further defined as a tuning mass operatively attached to a top side of a guide plate and a motor having a hollow shaft operatively attached to a bottom side of said guide plate, said guide plate being slidably connected on opposite sides thereof with guide means for guiding said guide plate between said first endplate and said second endplate.

5. The self-tuning vibration absorber of claim 1, wherein said attachment means is further defined as a rod rotatably attached to a first side plate and a second side plate, said first side plate being operatively attached to one end of said first end plate said second end plate, said second side plate being operatively attached to an opposite end of said first end plate and said second end plate, said rod also being rotatably attached to a support, said support including fastening means for fastening said support to the primary system.

6. The self-tuning vibration absorber of claim 5, wherein said rod acts as a torsion spring.

7. The self-tuning vibration absorber of claim 1, wherein said controller means is further defined as a computer.

8. The self-tuning vibration absorber of claim 7, wherein said controller means further includes algorithm means for computing XOR phase measurement.

9. The self-tuning vibration absorber of claim 8, wherein said algorithm means includes phase difference means for tuning a phase difference between said vibration of said primary system and said vibration of said carrier rod assembly to 90 degrees.

10. The self-tuning vibration absorber of claim 9, wherein said phase difference means is defined in Equation 27.

11. A method of vibration dampening, including the steps of:
  detecting a vibration of a primary system and detecting a vibration of a carrier rod assembly;
  analyzing the vibrations to determine a phase difference between the vibration of the primary system and the vibration of the carrier rod assembly;
  adjusting a hollow shafted motorized tuning mechanism in the carrier rod assembly, by actuating the motor to move the motorized tuning mechanism to tune the phase difference between the vibration of the primary system and the vibration of the carrier rod assembly to 90 degrees and then turning the motor off; and
  dampening the vibration of the primary system and the carrier rod assembly.

12. The method of claim 11, wherein said detecting step is further defined as detecting a vibration of a primary system with an accelerometer operatively attached to the primary system and detecting a vibration of a carrier rod assembly with an accelerometer operatively attached to the carrier rod assembly.

13. The method of claim 12, wherein said detecting step further includes sending signals containing properties of the vibrations of the primary system and the carrier rod assembly from the accelerometers to a controller.

14. The method of claim 13, wherein said analyzing step is further defined as analyzing the signals sent from the accelerometers with the controller.

15. The method of claim 14, wherein said analyzing step further includes determining a phase difference between the vibration of the primary system and the vibration of the carrier rod assembly with an algorithm mechanism.

16. The method of claim 15, wherein said analyzing step further includes performing XOR computation for phase difference calculation.

17. The method of claim 16, wherein said adjusting step is further defined as sending signals from the controller to the hollow shafted motorized tuning mechanism and adjusting the tuning mechanism along a screw rod with a motor based on the signals from the controller.

18. The method of claim 11, performed with the self-tuning vibration absorber of claim 1.

19. A method of reducing hunting motion in railcars, including the steps of:
  detecting a vibration of a railcar and detecting a vibration of a carrier arm assembly;
  analyzing the vibrations;
  adjusting a hollow shafted motorized tuning mechanism in the carrier arm assembly to tune a phase difference between the vibration of the railcar and the vibration of the carrier arm assembly to 90 degrees; and
  dampening the vibration of the railcar and the carrier rod assembly to reduce hunting motion.

* * * * *